US008955421B1

(12) United States Patent
Kountotsis et al.

(10) Patent No.: US 8,955,421 B1
(45) Date of Patent: Feb. 17, 2015

(54) METHODS AND SYSTEMS FOR DETECTING A GUN AND/OR BULLET WITHIN ONE'S VICINITY VIA AN ELECTRONIC DEVICE

(71) Applicants: Theodosios Kountotsis, Melville, NY (US); Agjah Libohova, E. Setauket, NY (US)

(72) Inventors: Theodosios Kountotsis, Melville, NY (US); Agjah Libohova, E. Setauket, NY (US)

( * ) Notice: Subject to any disclaimer, the term of this patent is extended or adjusted under 35 U.S.C. 154(b) by 100 days.

(21) Appl. No.: 13/726,899

(22) Filed: Dec. 26, 2012

(51) Int. Cl.
*F41A 17/08* (2006.01)
(52) U.S. Cl.
CPC ..................... *F41A 17/08* (2013.01)
USPC .......................................................... 89/1.11
(58) Field of Classification Search
CPC ................................ F41A 17/00; F41A 17/08

USPC ........................................ 42/70.01; 89/1.11
See application file for complete search history.

(56) References Cited

U.S. PATENT DOCUMENTS

| | | | |
|---|---|---|---|
| 6,429,769 B1* | 8/2002 | Fulgueira | 340/5.33 |
| 2005/0262751 A1* | 12/2005 | Leslie | 42/70.01 |
| 2011/0030262 A1* | 2/2011 | O'Shaughnessy et al. | 42/70.01 |

* cited by examiner

*Primary Examiner* — Stephen M Johnson
(74) *Attorney, Agent, or Firm* — Theodosios Kountotsis

(57) ABSTRACT

A gun is presented including a frame; a barrel connected to the frame; and a magazine mechanically cooperating with the frame, the magazine having at least one projectile stored therein. The gun further includes an electronic beacon non-removably incorporated within the gun, the electronic beacon configured to emit at least one signal to be received by at least one electronic device located within a pre-established vicinity of the gun. The electronic device provides a notification indicating proximity of the gun. The electronic beacon may be a radio transceiver operating at least one of a plurality of frequencies.

20 Claims, 13 Drawing Sheets

METHODS AND SYSTEMS FOR DETECTING A GUN AND/OR BULLET WITHIN ONE'S VICINITY VIA AN ELECTRONIC DEVICE

BACKGROUND

1. Field of the Related Art

The present disclosure relates to gun control solutions, and more particularly, but not exclusively, to methods and systems for detecting a gun and/or bullet having an electronic beacon incorporated or integrated therein, the detection occurring within one's vicinity or proximity via an electronic device, such as, for example, a mobile device.

2. Description of the Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Therefore, unless otherwise indicated herein, what is described in this section is not prior art to the description and claims in this application and is not admitted to be prior art by inclusion in this section.

Firearms are generally classified into three broad types: (1) handguns, (2) rifles, and (3) shotguns. Rifles and shotguns are both considered "long guns." A semi-automatic firearm fires one bullet each time the trigger is pulled and automatically loads another bullet for the next pull of the trigger. A fully automatic firearm (sometimes called a "machine gun") fires multiple bullets with the single pull of the trigger.

As of 2009, the United States had a population of approximately 307 million people. Based on production data from firearm manufacturers, there are roughly 300 million firearms owned by civilians in the United States as of 2010. Of these, about 100 million are handguns. As of January 2011, 39 states enacted laws permitting individuals with gun licenses to carry concealed guns in the streets. However, this number of guns on the streets has not come without horrific consequences, as witnessed by several horrific incidents in 2012 alone. Therefore, gun control solutions are necessary.

Gun control is an effort to stop the rise in violent crime by strengthening laws on the ownership of firearms. Gun control is not one issue, but several interrelated issues. To certain people gun control is a crime issue, to other people it is a rights issue. However, gun control is a safety issue, an education issue, a racial issue, and a political issue, among others. Within each of these issues, there are those who want more gun control legislation and those who want less. On both sides of this issue opinions range from moderate to extreme.

However, it can be agreed that guns are not for everyone. Certain individuals cannot handle a firearm safely and some individuals choose to use firearms inappropriately. Our society has passed laws regulating the ownership and use of firearms, and more legislation is being considered. Most of this legislation restricts, to some degree, the rights of individuals to possess and/or use firearms. Some restrictions are definitely necessary, as admitted by both sides of the gun control debate. Nevertheless, arguably, in certain instances, society may benefit from firearms in the hands of responsible citizens.

The Second Amendment to the United States Constitution states: "A well-regulated militia, being necessary to the security of a free state, the right of the people to keep and bear arms, shall not be infringed." The Founding Fathers included this in our Bill of Rights because they feared the Federal Government might oppress the population if the people did not have the means to defend themselves as a nation and as individuals. As a result, completely eliminating guns from our society is not a viable solution. Nevertheless, not everyone should be able to own and/or operate a firearm. Thus, at least in light of the events of 2012, further gun control solutions are necessary.

The rational given for most modern gun control legislation is "Crime Control." The Brady Bill is one example. The Brady Bill is named after James Brady, who was shot by John Hinckley during an assassination attempt on President Reagan in 1981. Supporters of the Brady Bill used that incident to gain support for their gun control legislation, claiming it would reduce crime and save lives. The fact is that the background check and waiting period included in the Brady Bill would not have prevented John Hinckley from legally purchasing the handgun used in that incident. Therefore, not all gun control legislation has had desired effects of limiting dangerous individuals from operating firearms.

Moreover, the Federal Gun Free School Zone Act of 1995 states that people with guns cannot walk within 1,000 feet of any school (kindergarten to 12th grade). However, on Dec. 14, 2012, in Newtown Conn., a lone gunman killed 26 people at the Sandy Hook elementary school, including 20 children. The gunman shattered the quiet of this southern New England town and left the nation reeling at the number of young lives lost. The question is, how much longer can we let horrible incidents like this one occur in our great nation. New gun control solutions need to be presented to avoid such future mayhem. Indeed, new gun control solutions need to strike a delicate balance between the $2^{nd}$ Amendment and the safety of our people.

In summary, throughout history violence has plagued the human race. Since ancient times the strong have preyed on the weak and the meek. We have passed laws to protect society, but the violence continues. Laws attempt to change human behavior, but laws are not able to change human nature. Laws are not enough to protect people from aggression. Inventions and innovations, however, may supplement laws in order to keep dangerous or violent people in our society in check. Thus, there is a need for systems and methods for effectively reducing gun violence in the United States. The present disclosure addresses the above-mentioned problems by providing citizens with a means to determine whether a loaded gun is within their immediate vicinity and act upon this information received in real-time.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The present disclosure provides for a projectile. The projectile includes a casing; a propellant; a primer configured to ignite the propellant; and an electronic beacon incorporated within the casing of the projectile, the electronic beacon configured to emit at least one signal to be received by at least one electronic device located within a vicinity of the projectile. The electronic device provides a notification indicating proximity of the projectile.

In one exemplary embodiment, the electronic beacon is a radio transceiver operating at, at least one of a plurality of frequencies.

In another exemplary embodiment, the at least one signal is continuously emitted from the electronic beacon. Alternatively, the at least one signal is intermittedly or periodically emitted from the electronic beacon during predetermined time periods.

In yet another exemplary embodiment, the electronic device is a mobile device. The mobile device may be a smart phone or a cell phone or a tablet.

In yet another exemplary embodiment, the mobile device includes a global positioning system (GPS) for providing information related to the distance, direction, and location of the electronic beacon.

In yet another exemplary embodiment, the notification is a visual notification or an audible notification or a combination thereof.

In one exemplary embodiment, the notification is automatically and continuously provided in real-time.

In another exemplary embodiment, the vicinity of the projectile for triggering the notification is determined by a manufacturer of the projectile.

In yet another exemplary embodiment, the vicinity of the projectile for triggering the notification is determined and inputted by a subject handling the electronic device.

The present disclosure also provides a method of detecting a loaded gun. The method includes the steps of inserting a projectile into a magazine of a gun, the projectile including a casing, a propellant, and a primer configured to ignite the propellant; incorporating an electronic beacon within the casing of the projectile; emitting, via the electronic beacon, at least one signal to be received by at least one electronic device located within a vicinity of the projectile; and providing, via the electronic device, a notification indicating proximity of the projectile.

The present disclosure further provides for a bullet. The bullet includes at least one electronic beacon incorporated therein and configured to emit at least one signal to be received by a mobile device located within a predetermined range of the bullet, the mobile device providing at least one notification based on identification information of the at least one beacon.

The present disclosure also provides a method for manufacturing a projectile, the method comprising forming/constructing a casing; forming/constructing a propellant; forming/constructing a primer configured to ignite the propellant; and forming/constructing an electronic beacon incorporated within the casing of the projectile, the electronic beacon configured to emit at least one signal to be received by at least one electronic device located within a vicinity of the projectile. The electronic device provides a notification indicating proximity of the projectile.

The present disclosure also provides a method for manufacturing a projectile, the method comprising forming/constructing at least one electronic beacon incorporated therein and configured to emit at least one signal to be received by a mobile device located within a predetermined range of the bullet, the mobile device providing at least one notification based on identification information of the at least one beacon.

The present disclosure provides for a gun. The gun includes a frame; a barrel connected to the frame; a magazine mechanically cooperating with the frame, the magazine having at least one projectile stored therein; an electronic beacon non-removably incorporated within the gun, the electronic beacon configured to emit at least one signal to be received by at least one electronic device located within a vicinity of the gun; wherein the electronic device provides a notification indicating proximity of the gun.

In one exemplary embodiment, the electronic beacon of the gun is a radio transceiver operating at least one of a plurality of frequencies. The at least one signal is continuously emitted from the electronic beacon of the gun. Alternatively, the at least one signal is intermittedly or periodically emitted from the electronic beacon of the gun during predetermined time periods.

In another exemplary embodiment, the electronic device is a mobile device including a global positioning system (GPS) for providing information related to the distance, direction, and location of the electronic beacon of the gun.

In yet another exemplary embodiment, the notification is a visual notification or an audible notification or a combination thereof. The notification is automatically and continuously provided in real-time.

In another exemplary embodiment, the vicinity of the gun is determined by a manufacturer of the gun or projectile. Alternatively, the vicinity of the gun is determined and inputted by a subject handling the electronic device.

The present disclosure also provides a method of detecting a loaded gun. The method includes the steps of inserting a projectile into a magazine of a gun; incorporating an electronic beacon within the gun; emitting, via the electronic beacon, at least one signal to be received by at least one electronic device located within a vicinity of the gun; providing, via the electronic device, a notification indicating proximity of the gun.

The present disclosure also provides a method for manufacturing a gun, the method comprising forming/constructing a frame; forming/constructing a barrel connected to the frame; forming/constructing a magazine mechanically cooperating with the frame, the magazine having at least one projectile stored therein; forming/constructing an electronic beacon non-removably incorporated within the gun, the electronic beacon configured to emit at least one signal to be received by at least one electronic device located within a vicinity of the gun; wherein the electronic device provides a notification indicating proximity of the gun.

The present disclosure provides for a gun detection system. The gun detection system includes a gun having a frame, a barrel connected to the frame, and a magazine mechanically cooperating with the frame; at least one projectile stored within the magazine of the gun; and an electronic beacon non-removably incorporated within the gun or the projectile, the electronic beacon configured to emit at least one signal to be received by at least one electronic device located within a vicinity of the gun or projectile; wherein the electronic device provides a notification indicating proximity of the gun or projectile.

The present disclosure also provides a method of detecting a loaded gun. The method includes the steps of providing a gun having a frame, a barrel connected to the frame, and a magazine mechanically cooperating with the frame; providing at least one projectile stored within the magazine of the gun; non-removably incorporating an electronic beacon within the gun or the projectile; sending at least one signal to be received by at least one electronic device located within a vicinity of the gun or projectile; and providing a notification indicating proximity of the gun or projectile via the electronic device.

Thus, all the features incorporated/integrated into the projectile may similarly be incorporated/integrated into the gun.

Also, all the features incorporated/integrated into the projectile or gun may similarly be incorporated/integrated into a loaded gun detection system.

The present disclosure also provides for a loaded weapon notification system, including a weapon having a frame, a barrel connected to the frame, and a magazine mechanically cooperating with the frame; at least one projectile configured to be stored within the magazine of the weapon; and an electronic beacon non-removably incorporated within the weapon and/or the projectile, the electronic beacon configured to emit at least one signal to be received by at least one electronic device located within a predetermined range of the weapon and/or projectile. The electronic device provides a notification indicating the weapon and/or projectile to be within the predetermined range, the notification subsequently transmitted to at least one social network of a subject associated with the electronic device.

In one exemplary embodiment, the at least one social network permits creation of at least one predetermined list of contacts, a list of the at least one predetermined list of contacts configured to automatically receive the notification indicating the weapon and/or projectile to be within the predetermined range.

In another exemplary embodiment, the list of the at least one predetermined list of contacts includes at least one member pre-selected by the subject associated with the electronic device. The at least one member is a friend or family member or law enforcement.

In yet another exemplary embodiment, the notification is transmitted to at least one member of personal associations of the at least one social network of the subject, the at least one member to be contacted determined based on relationship weighing factors.

In yet another exemplary embodiment, the notification is transmitted to at least one member of personal associations of the at least one social network of the subject, the at least one member to be contacted determined based on interaction weighing factors.

In yet another exemplary embodiment, the at least one social network tracks and records notifications to the subject indicating weapons and/or projectiles within one or more predetermined ranges.

The present disclosure also provides for a method of detecting a loaded gun. The method includes the steps of providing a weapon and at least one projectile configured to cooperate with the weapon; non-removably incorporating an electronic beacon within the weapon and/or the projectile; emitting at least one signal from the electronic beacon to be received by at least one electronic device located within a predetermined range of the weapon and/or projectile; sending a notification indicating the weapon and/or projectile to be within the predetermined range; and subsequently transmitting the notification to at least one social network of a subject associated with the electronic device.

The present disclosure also provides for a non-transitory computer-readable storage medium embodying instructions executable by a computer to perform a method including the steps of: providing a weapon and at least one projectile configured to cooperate with the weapon: non-removably incorporating an electronic beacon within the weapon and/or the projectile; emitting at least one signal from the electronic beacon to be received by at least one electronic device located within a predetermined range of the weapon and/or projectile; sending a notification indicating the weapon and/or projectile to be within the predetermined range; and subsequently transmitting the notification to at least one social network of a subject associated with the electronic device.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

BRIEF DESCRIPTION OF THE DRAWINGS

Various embodiments of the present disclosure will be described herein below with reference to the figures wherein.

Figure 1:
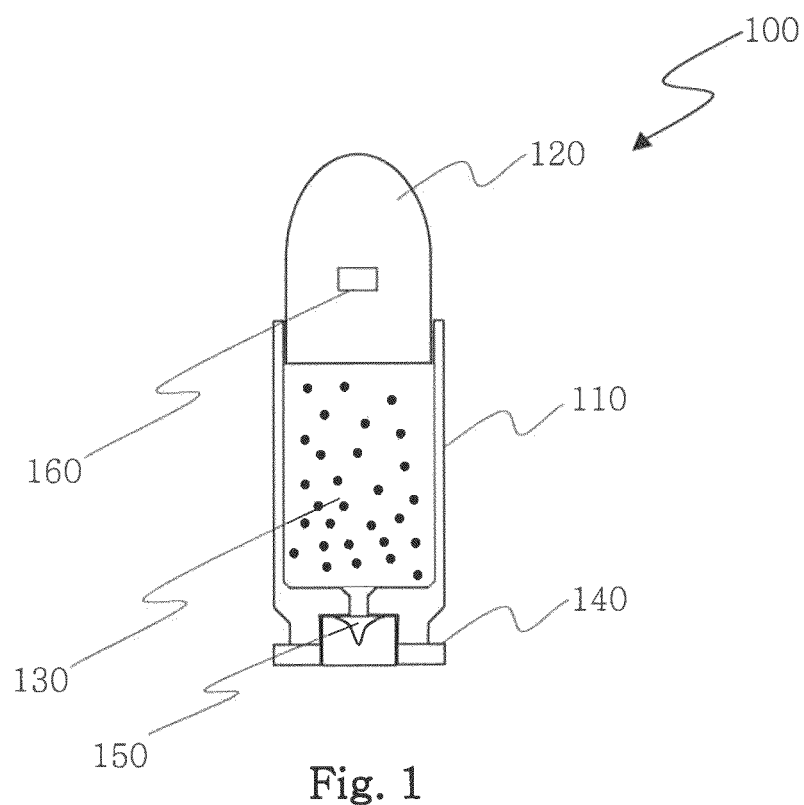
FIG. 1 is a cross-sectional view of a projectile including an electronic beacon in a head portion of the projectile, in accordance with the present disclosure.

The figures depict preferred embodiments of the present disclosure for purposes of illustration only. One skilled in the art will readily recognize from the following discussion that alternative embodiments of the structures and methods illustrated herein may be employed without departing from the principles of the present disclosure described herein.

DETAILED DESCRIPTION

It is an object of the present disclosure to provide systems and methods for detecting a gun and/or bullet having an electronic beacon (e.g., a transceiver) incorporated or integrated or embedded therein, the detection occurring within one's vicinity via an electronic device, such as, for example, a mobile device.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is intended to cover all modifications, equivalents, and alternatives falling within the spirit and scope of the present disclosure as defined by the claims. Like numbers refer to like elements throughout the description of the figures.

Unless otherwise indicated, all numbers expressing quantities and conditions, and so forth used in the specification and claims are to be understood as being modified in all instances by the term "about." The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof. The term "comprise," "comprises," "comprised," or "comprising." if and when used in this document, should be interpreted non-exclusively, i.e., should be interpreted to mean "consisting of or including."

Prior to describing the present disclosure in further detail, it will first be helpful to define various terms that will be used throughout the following discussion. For example:

The term "storage" may at least refer to data storage. "Data storage" may at least refer to any article or material (e.g., a hard disk) from which information may be capable of being reproduced, with or without the aid of any other article or device. "Data storage" may refer to the holding of data in an electromagnetic form for access by a computer processor. Primary storage may be data in random access memory (RAM) and other "built-in" devices. Secondary storage may be data on hard disk, tapes, and other external devices. "Data storage" may also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "mobile device" may refer at least to one or more personal computers (PCs), a standalone printer, a standalone scanner, a mobile phone, a cell phone, a Smart Phone, and iPhone®, an MP3 player, audio electronics, video electronics, portable electronics, an e-book reader (such as the Nook® or Kindle® or, Sony Reader®), GPS systems, televisions, recording and/or reproducing media (such as CDs, DVDs, camcorders, cameras, etc.) or any other type of consumer or non-consumer analog and/or digital electronics. Such consumer and/or non-consumer electronics may apply at least in any type of entertainment, communications, home, and/or office capacity. Thus, the term "mobile device" may refer to any type of electronics suitable for use with a circuit board and intended to be used by a plurality of individuals for a variety of purposes. The electronic device may be any type of computing and/or processing device. The term "mobile device" may be associated with or cooperating with or have incorporated therein a transponder or transceiver.

The term "processing" may at least refer to determining the elements or essential features or functions or processes of one or more transponder or transceiver or beacon recognition, collection, and analysis systems for computational processing. The term "process" may further refer to tracking data and/or collecting data and/or manipulating data and/or examining data and/or updating data on a real-time basis in an automatic manner and/or a selective manner and/or manual manner (continuously or periodically).

The terms "Internet" or "network" as used herein, may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein.

The term "apparatus" may refer to at least a device, a system, an appliance, a contraption, a machine, a mechanism, utensils, tools, implements, instruments, gadgets, and widgets. The term "apparatus" may be used interchangeably with the term "electronic device."

The term "module" may refer to at least a self-contained component (unit or item) that is used in combination with other components and/or a separate and distinct unit of hardware or software that may be used as a component in a system, such as a loaded gun detection system. The term "module" may also refer to at least a self-contained assembly of electronic components and circuitry, such as a stage in a computer that is installed as a unit. The term "module" may be used interchangeably with the term "unit."

The term "analyze" may refer to at least determining the elements or essential features or functions or processes of a plurality of analyzing modules related to the electronic beacons. The term "analyze" may further refer to at least tracking data and/or collecting data and/or manipulating data and/or examining data and/or updating data and/or inspecting data and/or distinguishing data on a real-time basis in an automatic manner and/or a selective manner and/or manual manner (continuously, repeatedly, and/or intermittedly).

The term "connect" or "connecting" may refer at least to adhere, affix, anchor, attach, band, bind, bolt, bond, brace, button, cohere, fasten, couple, embed, establish, fix, grip, hold, hook, implant, link, lock, lodge, screw, seal, rivet, tack on, tighten, or unite. The term "connect" or "connecting" may at least refer to linking/fastening/attaching/locking any type of materials or units or components or elements in a removable/detachable/interchangeable manner. The term "connect" or "connecting" may also refer to at least materials or units or components or elements associated with each other or in operable communication with each other or cooperating with each other or in operative communication with each other.

The term "projectile" may refer to a bullet or ammunition. The term "gun" may refer to any weapon that shoots a projectile, including, but not limited to, a rifle, a handgun, a revolver, a pistol, a shotgun, a musket, or firearm.

The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure relates to positioning or placing or incorporating or embedding or integrating an electronic beacon in a projectile and/or a gun during the manufacturing of the projectile and/or gun. In other words, newly produced projectiles and/or guns may include an electronic beacon that emits or sends or transmits one or more signals (such as, but not limited to, radio signals) to one or more exterior sources that are in the vicinity or proximity of the projectile and/or gun. The exterior sources may be electronic devices, such as mobile devices. However, any type of electronic devices may be contemplated, as described and defined herein.

The present disclosure relates to triggering a warning or alert, via an electronic device, when a loaded gun is in the vicinity or proximity of a subject. The warning may be a visual warning or an audible warning or a combination thereof. The warning or alert or notification indicates to the subject handling or manipulating the electronic device that there may be an imminent danger of a shooting, since a loaded gun is approaching his/her vicinity (since the approach of a loaded gun is unexpected to the subject).

The present disclosure relates to an electronic beacon that is emitted or sent or transmitted, continuously or intermittedly, from the projectile and/or the gun. The signal, which may be a radio signal, can be easily picked up or received by an electronic device having a receptor means. The electronic device is thus actuated or activated or prompted or triggered to provide an alert or warning or notification or indication that a loaded gun (or projectile) is within the vicinity or proximity of the subject. The subject may then take appropriate measures to avoid any potential imminent danger.

The present disclosure aids innocent people in avoiding shootings by a dangerous or violent or mentally unstable individual walking around with a loaded gun. It is known that just about everyone has some type of mobile device on them at any given time, whether inside a structure or outside. Thus, it would be beneficial to somehow warn or alert or notify such people whether a loaded gun is within their vicinity or proximity. One solution would be to incorporate a beacon signal into projectiles (e.g., bullets) and/or into the gun itself. This beacon signal may continuously, and in real-time, transmit or send one or more signals at a plurality of different frequencies that may be picked up by an electronic device, such as a mobile device, within the vicinity or proximity or a range having a particular diameter or radius with respect to the mobile device.

The present disclosure refers to systems and methods that enable a user of a mobile device, such as, but not limited to, a cell phone or Smart phone or tablet, to automatically determine whether a loaded gun is within the vicinity or range or proximity of the user. In other words, a dangerous or violent person operating a loaded gun may be detected when such person approaches individuals having mobile devices capable of detecting such signals relayed from an electronic beacon incorporated within the projectile and/or gun. The loaded gun may itself include the electronic beacon. However, the projectile or bullet itself may include the electronic beacon. The electronic beacon emits or sends or transmits a signal that is detected by the mobile device when the electronic beacon is within a predetermined or predefined or pre-established distance or radius of the mobile device. The distance or radius or range or spatial relation that triggers or activates the warning or alert or notification may be predetermined by the manufacturers' of the gun/projectile or may be inputted via the electronic device by the user or subject operating the electronic device.

The present disclosure also refers to systems and methods of informing or notifying the person handling the mobile device that danger may be lurking nearby. As such, the person handling or manipulating the mobile device may contact the authorities or may nm for cover or take any other precautions to protect themselves or others less capable of protecting themselves (e.g., children or the elderly). The systems and methods of the exemplary embodiments of the present disclosure provide the person with a certain time period, maybe a few seconds or minutes or so, to react to such incidents and not be caught totally by surprise. Additionally, the exemplary embodiments of the present disclosure further enable people manipulating the electronic device to have a better idea of where the loaded gun is with respect to their current position or space or region or reference point. Any type of positional or orientational algorithm (software or code, as defined at least herein) may be used to help determine or pinpoint where the loaded gun is located with respect to the persons manipulating the electronic devices.

The present disclosure refers to systems and methods that prevent a user or subject from tampering with the electronic beacon. In other words, a user or subject is not able to remove or deactivate or destroy the electronic beacon once incorporated or integrated with the projectile and/or gun. Once an individual purchases a gun and/or projectiles having the electronic beacon incorporated therein, it is contemplated that it would be extremely difficult for that person to tamper with or disable such mechanism.

In one exemplary embodiment, a GPS unit of the mobile device may indicate to the user the distance, direction, and relative location of the beacon signal in order to help the user determine or evaluate his/her options. If the beacon signal is, for example, 100 ft away in an opposite direction, the user may alert the authorities by, for example, contacting 911. However, if the beacon signal is, for example, 10 ft away (maybe in the adjoining room or hallway), the user may decide that danger is imminent and hide in a safe location (for example, in a closet). Therefore, a relative position may be easily and quickly determined in real-time between the person handling the electronic device and the loaded gun.

Concerning the exemplary embodiments of the present disclosure, a beacon or electronic beacon may a device or apparatus or module designed or configured to attract attention to a specific location or to reveal their relative position. Beacons may also be combined with semaphoric or other indicators to provide important information to another source, such as an electronic device, as described herein.

The most common beacons are radio beacons, which broadcast a radio signal which is picked up by radio direction finding systems (such as electronic devices, as defined herein) to determine the bearing to the beacon, but the term may also cover infrared and sonar beacons. One skilled in the art may contemplate using any type of beacon to achieve the desired results of the present exemplary embodiments.

A radio beacon is a transmitter at a known location, which transmits a continuous or periodic (or intermittent) radio signal with limited information content (for example its identification or location), on a specified radio frequency. Occasionally the beacon function is combined with some other transmissions, like telemetry data or meteorological information. Radio beacons may also be designated as EPIRB beacons. EPIRB stands for Emergency Position Indicating Radio Beacon. An EPIRB is meant to help rescuers locate you in an emergency situation, and these radios have saved many lives since their creation in the 1970s. Boaters are the main users of EPIRBs. A modern EPIRB is a sophisticated device that contains: (i) a 5-watt radio transmitter operating at 406 MHz; (ii) a 0.25-watt radio transmitter operating at 121.5 MHz; and (iii) a GPS receiver. There are two types of EPIRBs—Category I or Category II that are approved for use in the United States today. Both transmit only on a frequency of 406 MHz. It is contemplated that the electronic beacon of the exemplary embodiments of the present disclosure is an EPIRB style beacon.

An infrared beacon (IR beacon) transmits a modulated light beam in the infrared spectrum, which can be identified easily and positively. However, a line of sight clear of obstacles between the transmitter and the receiver may be required.

Concerning the exemplary embodiments of the present disclosure, a radio wave is an electromagnetic wave propagated by an antenna. Radio waves have different frequencies, and by tuning a radio receiver to a specific frequency one may pick up a specific signal. In the United States, the FCC (Federal Communications Commission) decides who is able to use which frequencies for which purposes, and the FCC issues licenses to stations for specific frequencies.

All cellular phone networks worldwide use a portion of the radio frequency spectrum designated as ultra high frequency, or "UHF," for the transmission and reception of their signals. The ultra high frequency band is also shared with television, Wi-Fi and Bluetooth transmission. The cellular frequencies are the sets of frequency ranges within the ultra high frequency band that have been allocated for cellular phone use.

Cell phones have a frequency range of between about 824 to 849 MHz. Cordless phones have a frequency of about 900 MHz. Global Positioning Systems (GPSs) have a frequency range of about 1,227 MHz to about 1,575 MHz. In particular:

The 869-894 MHz cellular band is divided into 2 frequency blocks (A and B). There are 306 Metropolitan Service Areas and 428 rural service areas. Each trading area consists of one or more counties.

The 1850-1990 MHz PCS band is divided into six frequency blocks (A through F). Each block is between about a 10 MHz and 30 MHz bandwidth. License (A or B) is granted for a Major Trading Areas (MTAs). License (C to F) is granted for a Basic Trading Areas (BTAs). There are 51 MTAs and 493 BTAs in the United States.

The AWS bands, auctioned in the summer of 2006, were designed for frequency ranges of about 1,710-1,755 MHz, and 2.110-2.155 MHz. The spectrum was divided into blocks: A blocks were for Cellular Market Areas, based on existing cellular (1G) licenses, and were 2×10 MHz. B and C blocks (2×10 MHz and 2×5 MHz respectively) were for Basic Economic Areas, larger than CMAs, usually comprising large portions of single states. D, E, and F blocks covered huge areas of the country, typically several states at a time, and covered 2×5 MHz for D and E blocks, 2×10 MHz for F.

The 700 MHz band was auctioned in early 2008 using spectrum previously used by television stations' analog broadcasts, with Verizon Wireless and AT&T Mobility winning the majority of available spectrum. Qualcomm and Echostar were winners of a significant amount of broadcast-oriented spectrum. Verizon Wireless has announced they are using the lower band of the 700 MHz spectrum to deploy their LTE network starting on Dec. 5, 2010.

The SMR 800 MHz band was used exclusively for iDEN technology, however, Sprint Nextel is deploying CDMA and LTE technology on this band. As of September 2011, the FCC has approved several CDMA devices for use on the SMR band.

3G and 4G technologies operate between frequencies of about 698 MHz to 806 MHz in the 700 band.

SMR iDEN, ESMR CDMA (future). ESMR LTE (future) operate between frequencies of about 806 MHz to 824 MHz and 851 MHz to 869 MHz in the 800 band.

GSM, IS-95 (CDMA), 3G operate between frequencies of about 824-849 MHz and 869-894 MHz in the 850 band.

GSM, IS-95 (CDMA), 3G, 4G operate between frequencies of about 1,850-1,910 MHz and frequencies of about 1,930-1,990 MHz in the PCS band.

3G and 4G operate between frequencies of about 1,710-1,755 MHz and frequencies of about 2,110-2,155 MHz in the AWS band.

4G operates between frequencies of about 2,496-2,690 MHz in the BRS/EBS band.

The exemplary embodiments of the present disclosure are capable of detecting any of the above frequencies or any future frequencies used by mobile devices or GPS units or other radio or signal transmitting devices. In other words, the electronic beacons may be configured to detect any desirable frequency or frequency range associated with electronic devices or mobile devices, such as, but not limited to, cell phones, Smart phones and/or tablets. It is also contemplated that any other electronic device may incorporate a means for picking up signals emitted from one or more electronic beacons. For example, "electronic devices" may refer to at least, or may include but are not limited to, a mouse, keyboard, Bluetooth™ adapter, global positioning system (GPS) receiver, remote control, audio module, user interface module, electronic-book reader module, radio frequency identification (RFID) reader, barcode reader, digital projector, universal serial bus stick, magnetometer, fingerprint reader, current/voltage measuring device, electrocardiogram, pulse measuring device, and stethoscope. Electronic devices may thus also refer to medical devices. Electronic devices may any type of device or apparatus or system or configuration or module or unit.

Additionally, "electronic devices" may refer to at least, or may include but are not limited to, an electronic book, displays, television sets, electronic paper, watches, electronic calculators, cellular phones, personal digital assistants, cellular telephone, view finder, direct view type video tape recorder, car navigation system, pager, electronic notebook or personal computer (PC), electric calculator, word processor, work station, picture telephone, point of sale (POS) terminal (s), point-of-entry (POE) terminal(s) and any type of electrical or mechanical or electromechanical apparatus/system/ configuration with one or more touch panels.

Concerning the exemplary embodiments of the present disclosure, a transceiver is a device including both a transmitter and a receiver, which are combined and share common circuitry or a single housing. When no circuitry is common between transmit and receive functions, the device is a transmitter-receiver. Technically, transceivers must combine a significant amount of the transmitter and receiver handling circuitry. Similar devices include transponders, transverters, and repeaters. In radio frequency identification, a transponder is a device that emits an identifying signal in response to an interrogating received signal. One skilled in the art may contemplate using any type of transmitter/receiver or transceiver or transponder for achieving the desired results described herein.

In an alternative embodiment, one skilled in the art may contemplate incorporating or embedding or integrating a beacon signal with the gun itself, instead of the projectile or bullet (as described above). A gun is a weapon designed to discharge a projectile. The projectile may be solid, liquid, gas or energy and may be free, as with bullets and artillery shells, or captive as with Taser probes. The means of projection varies according to design, but is usually effected by the action of gas pressure, either produced through the rapid combustion of a propellant or compressed and stored by mechanical means, operating on the projectile inside an open-ended tube in the fashion of a piston. The confined gas accelerates the movable projectile down the length of the tube imparting sufficient velocity to sustain the projectile's travel once the action of the gas ceases at the end of the tube or muzzle. Alternatively, acceleration via electromagnetic field generation may be employed in which case the tube may be dispensed with and a guide rail substituted. One skilled in the art may contemplate any type of gun, as defined herein, for incorporating or embedding or integrating an electronic beacon therein or thereon or thereabout.

Reference will now be made in detail to embodiments of the present disclosure. While certain embodiments of the present disclosure will be described, it will be understood that it is not intended to limit the embodiments of the present disclosure to those described embodiments. To the contrary, reference to embodiments of the present disclosure is intended to cover alternatives, modifications, and equivalents as may be included within the spirit and scope of the embodiments of the present disclosure as defined by the appended claims.

Embodiments will be described below while referencing the accompanying figures. The accompanying figures are merely examples and are not intended to limit the scope of the present disclosure.

With reference to FIG. 1, there is presented a cross-sectional view of a projectile including an electronic beacon in a head portion of the projectile, in accordance with the present disclosure.

In FIG. 1, a projectile 100 is depicted having a casing 110 and a head portion 120. The projectile 100 includes a propellant 130 enclosed within the casing 110. The rim 140 provides the extractor on the firearm (see FIG. 3A) a place to grip the casing 110 to remove it from the chamber once fired. A primer 150 is in the vicinity of the propellant 130 in order to ignite the propellant 130. Additionally, an electronic beacon 160 is placed in the projectile 100. The electronic beacon 160 may be positioned in the head portion 120 of the projectile 100. However, one skilled in the art may contemplate positioning or placing the electronic beacon 160 on any interior or exterior portion of the projectile 100 in order to prevent the projectile 100 from being tampered with.

The electronic beacon 160 may include any type of circuitry for emitting one or more signals (such as, but not limited to, radio signals) to be received by an electronic device or a mobile device or any type of external source. The electronic beacon 160 may be a transceiver or a communication device that sends or transmits or communicates, for example, radio signals to one or more beacon receptors located or positioned or integrated within or about an electronic device or mobile device. The beacon receptors may be receptors existing in current electronic devices that are merely programmed by software or code, as defined at least herein, to receive such beacon signals in real-time on a continuous or periodic basis.

Figure 2:
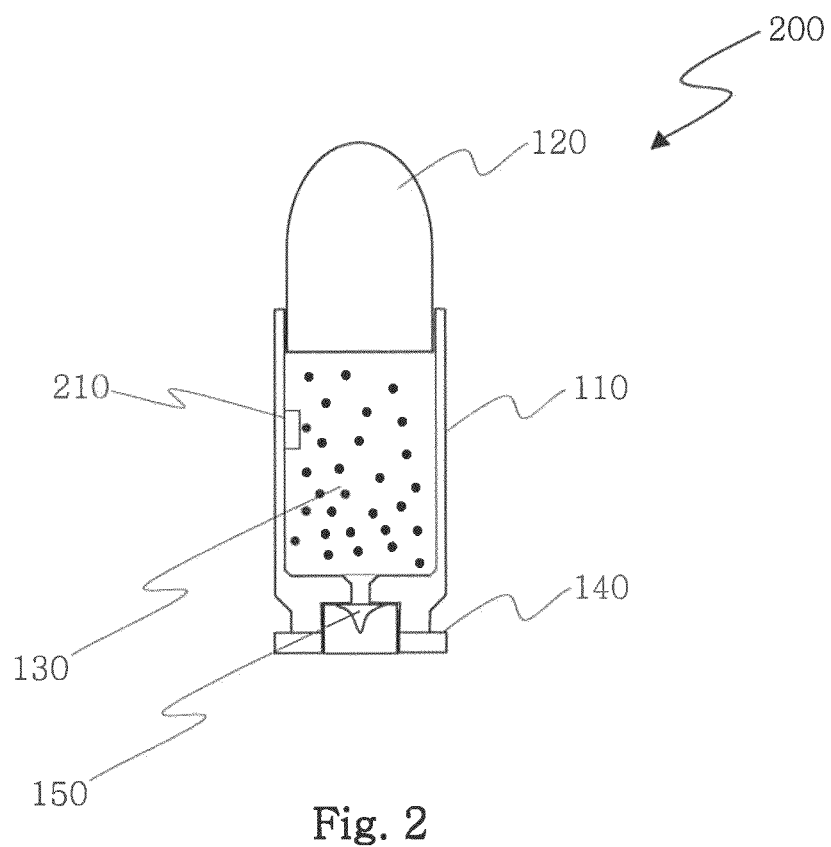
FIG. 2 is a cross-sectional view of a projectile including an electronic beacon in a body portion of the projectile, in accordance with the present disclosure.

With reference to FIG. 2, there is presented a cross-sectional view of a projectile including an electronic beacon in a body portion of the projectile, in accordance with the present disclosure.

In FIG. 2, the electronic beacon 210 is shown positioned or placed or embedded or incorporated or integrated within the casing 110 of the projectile 200. A description of similar elements to FIG. 1 is omitted. As mentioned above, one skilled in the art may contemplate various interior/exterior positional or orientational methodologies for the electronic beacon 210. Of course, it is contemplated that the electronic beacons 110, 210 of FIGS. 1 and 2 are adapted and dimensioned to prevent tampering. Moreover, the projectiles 100, 200 may be constructed or formed as any shape or size to fit into one or more magazines of a plurality of different guns. It is contemplated that the shape of the projectiles 100, 200 may be more circular, oval, rectangular, elongated, etc., in accordance with the dimensions of the magazine of any type of gun.

Figure 3A:
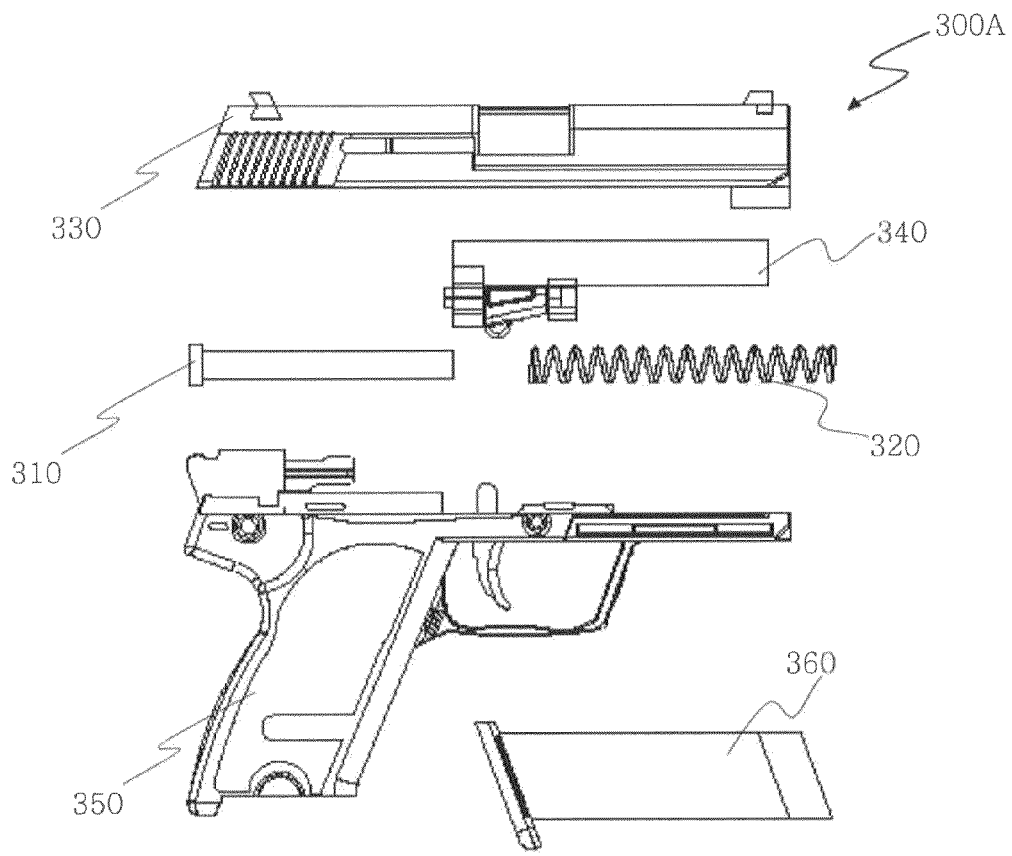
FIG. 3A is an exploded view of a handgun, in accordance with the present disclosure.
Figure 3B:
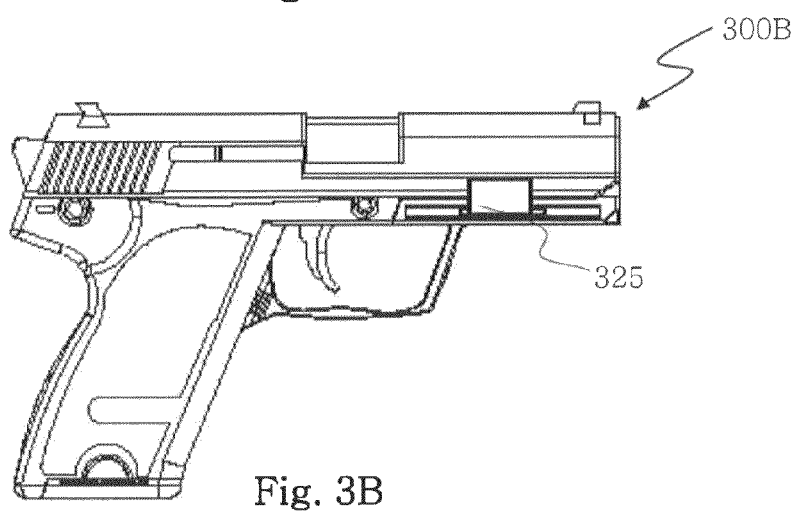
FIG. 3B is a perspective view of the handgun of FIG. 3A in an assembled configuration, in accordance with the present disclosure.

With reference to FIG. 3A, there is presented an exploded view of a handgun, in accordance with the present disclosure, whereas FIG. 3B presents a perspective view of the handgun of FIG. 3A in an assembled configuration, in accordance with the present disclosure.

In FIG. 3A, a handgun 300A is shown in an exploded view, as an example of a gun for receiving the projectiles 100, 200 (see FIGS. 1 and 2). Of course, one skilled in the art may contemplate any type of gun for receiving any type of projectiles, without limitation to shape or size of either the gun or the projectile. The handgun 300A may include a recoil spring guide 310 that is inserted into a recoil spring 320. A barrel 340 is inserted into the bottom of a slide 330, and the recoil spring 320 and the recoil spring guide 310 are attached to the bottom of the slide 330 and barrel 340. The assembled top portion, including the slide 330 and the barrel 340 is then added to the top of the frame 350. Then, the magazine 360 is inserted into the bottom of the frame 350. This creates an assembled handgun 300B, shown in FIG. 3B.

FIG. 3B also illustrates an electronic beacon 325 positioned on or about the frame 350 of the assembled gun 300B. This is merely an example of a few main components of a gun and is described for illustrative purposes only. A handgun may be assembled in a variety of different ways. The exemplary embodiments of the present disclosure are not limited to the components of a handgun or gun in general. Once again, any type of gun may be used in combination with the projectiles 100, 200 of FIGS. 1 and 2. Moreover, the electronic beacon 325 may be positioned or placed or integrated or embedded on any component or element of a gun, interior or exterior, such that it is not tampered with.

Figure 4:
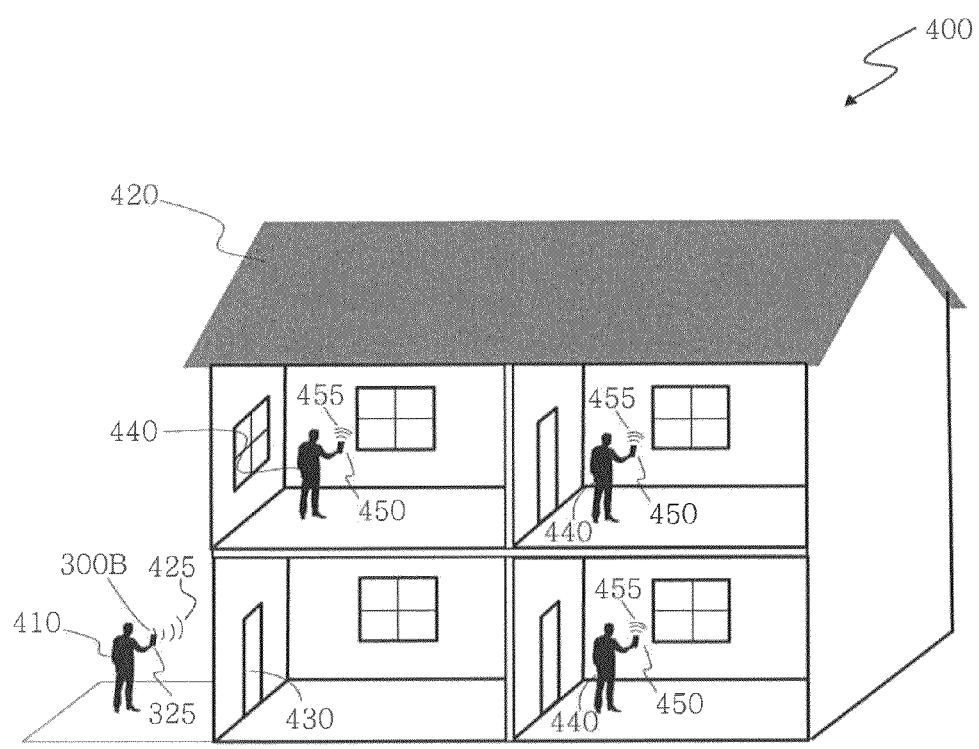
FIG. 4 is a perspective view of a loaded gun detection system, where an individual with a loaded gun is approaching a house having several people therein, and where the mobile devices of the several people identify the beacon signal of the loaded gun, in accordance with the present disclosure.

With reference to FIG. 4, there is presented a perspective view of a loaded gun detection system, where an individual with a loaded gun is approaching a house having several people therein, in accordance with the present disclosure.

The system 400 depicts an individual 410 holding a handgun 300B (see FIG. 3B) having an electronic beacon 325 embedded or incorporated or integrated within either the gun or the projectile. As stated above, in one exemplary embodiment, the projectile may include an electronic beacon. However, in another exemplary embodiment, the gun may include the electronic beacon. It is contemplated that either scenario would work in FIG. 4 and in all exemplary embodiments of the present disclosure described herein.

In FIG. 4, the individual 410 may be approaching a building 420 having a door 430. The building may be, for example, a school, but is not limited thereto. As the individual 410 holding the loaded gun 300B approaches the door 430, the signal 425 emitted from the electronic beacon 325 is relayed to any electronic device, such as, but not limited to, mobile devices or tablets or PCs, within a predetermined or predefined or pre-registered or pre-established distance of the loaded gun 300B. The relative distance may be, for example, 10 ft or 25 ft or 50 ft or 100 ft, etc. The distance that triggers or activates the notification or alert or warning may be predetermined or may be inputted by a user of the electronic device, as described in detail further below. The distance may be a range or radial space or region relative to the current position of the person manipulating the electronic device. Thus, the electronic device may be programmed to detect or identify or recognize or distinguish a relative positional relationship between itself and at least one projectile and/or gun having an electronic beacon incorporated therein. A positional relationship established between the electronic device and the electronic beacon of the projectile and/or gun triggers or activates a notification, such as a safe condition/status or danger/dangerous condition/status, as discussed further below.

Therefore, several users 440 located within the building 420 have their electronic devices 450 activated or triggered to emit a warning or alert or notification 455 indicating that a dangerous or violent or mentally unstable individual 410 is within a certain proximity to the building 420. As a result, users or subjects 440 are immediately, in real-time, capable of determining that a threat to their lives or to the lives around them is imminent, and necessary actions need to be taken. Thus, users 440 won't be caught by surprise by a shooter entering a building with the intent to shoot or cause mayhem. Users 440 would have at least some time, maybe a few minutes or so to determine a quick course of action in order to avoid being shot at or from disarming the shooter or from exiting the building from a different entrance (since they are aware of the relative direction and/or distance and/or positional orientation of the shooter with respect to where they are positioned).

Moreover, the microprocessor or electronics or circuitry within the mobile device has the capability to determine a relative direction and/or distance and/or positional orientation of the loaded gun with respect to the person manipulating the mobile device. In one exemplary embodiment, a user may download a software app to their electronic device or phone, such as a loaded gun detection app. This app could enable a user to determine the direction and/or distance and/or orientation and/or regional space and/or radial space of the loaded gun in real-time and at least continuously with respect to their current position.

Figure 5:
FIG. 5 is a perspective view of a mobile device notifying the user that a loaded gun has been detected within the immediate vicinity of the user, in accordance with the present disclosure.

With reference to FIG. 5, there is presented a perspective view of a mobile device notifying the user that a loaded gun has been detected within the immediate vicinity of the user, in accordance with the present disclosure.

In FIG. 5, the mobile device 450 includes a body portion 510, a display screen 530, and a plurality of input keys 540. The mobile device 450 may also include some type of antenna 520. Additionally, the mobile device 450 may also include a GPS module or unit 550.

As shown, the display screen 530 displays a message 535. The message may state: "Alert: Loaded Gun Detected." In other words, the message indicates or warns or alerts or notifies the user that a loaded gun is in the vicinity or proximity of the user. Of course, one skilled in the art may contemplate a plurality of different text or non-text messages or visual messages or audible messages or a combination thereof. For example, the message may say, "Alert," and then show a dot or other indicator (representing the potential shooter) moving in a certain direction. The message may also indicate an approximate distance of the shooter from the user of the mobile device 450. Thus, in FIG. 5, the notification may be a notification of a danger or dangerous condition/state.

One skilled in the art may contemplate using a plurality of different indication and/or notification mechanisms for indicating when a loaded gun is within the proximity of the user. The plurality of indication mechanisms may be visual mechanisms or audible mechanisms or a combination thereof. Also, indication/actuation mechanisms may be of any size imaginable, from a few millimeters to a few inches and constructed from any type of materials (LEDs, LCDs, or flexible displays). There is no limitation to the type of message conveyed to the user of the mobile device 450.

Figure 6:
FIG. 6 is a perspective view of a mobile device notifying the user that a loaded gun has been detected within the immediate vicinity of the user, the message indicating a safe condition (law enforcement nearby), in accordance with the present disclosure.

With reference to FIG. 6, there is presented a perspective view of a mobile device notifying the user that a loaded gun has been detected within the immediate vicinity of the user, the message indicating a safe condition (law enforcement nearby), in accordance with the present disclosure.

One obvious question is, how it may be detected whether it is a law enforcement individual that approaches the individual and not a person that is dangerous or violent or mentally unstable.

In FIG. 6, the mobile device 450 includes a body portion 510, a display screen 530, and a plurality of input keys 540. The mobile device 450 may also include some type of antenna 520. Additionally, the mobile device 450 may also include a GPS module or unit 550.

As shown in FIG. 6, the display screen 530 displays a message 635. The message may state: "Loaded Gun: Law Enforcement." In other words, the message indicates that law enforcement is in the area with a loaded gun. For example, a police officer or FBI agent or anyone who is authorized to carry a loaded gun. Therefore, there may be instances when a detection is made of a loaded gun by the mobile device 450 that indicates a "safe condition" or "safe state" for the user. The "safe condition" may pertain to an indication that an authorized individual is approaching with a loaded gun, and, thus, no precautionary measures need to be taken. Therefore, the indication or notification may indicate or relay or convey several different conditions/states related to the projectile and/or gun based on identifiers related to the electronic beacon of the gun and/or projectiles.

For example, in one exemplary scenario, if there is a shooting in a building, the user of an electronic device, such as mobile device 450 may pick up one or more signals sent from the approaching loaded gun. The signals indicate a non-authorized individual or unsafe condition/state. The user may then hide somewhere within the building. In the meantime, local authorities may have been notified of the shooting. As such, law enforcement personnel is fast approaching the building and attempting to enter. Law enforcement may encounter the shooter and disable him or arrest him or kill him. The law enforcement personnel may then walk around the building to find people. The people in hiding would be notified of when the law enforcement personnel arrived and would also be notified that the law enforcement personnel are approaching to provide help. Therefore, the people within the building may know in real-time when the shooter enters, where the shooter is (e.g., relative to their position), when law enforcement personnel have arrived at the scene, and who is approaching them (whether the shooter or law enforcement) based on the signals received from the electronic beacons of the loaded guns of the shooter and law enforcement.

For example, in a second exemplary scenario, a person may be walking down the street in Manhattan, N.Y. The user's mobile device goes off and indicates a loaded gun in the vicinity. The user looks on the display screen and realizes that the potential threat is several feet behind him/her. However, the display screen displays a message indicating a safe condition, for example, law enforcement within vicinity or proximity. The user may turn around and see a police officer who obviously is authorized to carry the loaded gun. As such, the person is put to ease and need not take any precautionary measures.

For example, in a third scenario, several hundred people may be in a movie theater watching one or more movies playing on various screens. If a person having a loaded gun enters the movie theater and walks down the hallway with entrances to all the screens, the mobile devices of the people within the movie theater may be triggered or activated to send or transmit an alert or notification that a loaded gun is close by or within their immediate vicinity. Of course, the people watching the movies in the movie theater will realize that guns are not allowed in the movie theater and will react accordingly, whether by calling 911 or by fleeing. Of course, many people may determine in which direction to flee by locating the position and/or direction of the potential threat via their mobile device.

One skilled in the art will realize that all these examples are non-limiting examples presented to illustrate a variety of ways to execute the exemplary embodiments of the present disclosure. A number of different scenarios may be contemplated where at least one person is notified, in real-time, that an imminent threat (e.g., a loaded gun) is within their vicinity or proximity or range or radius.

Figure 7:
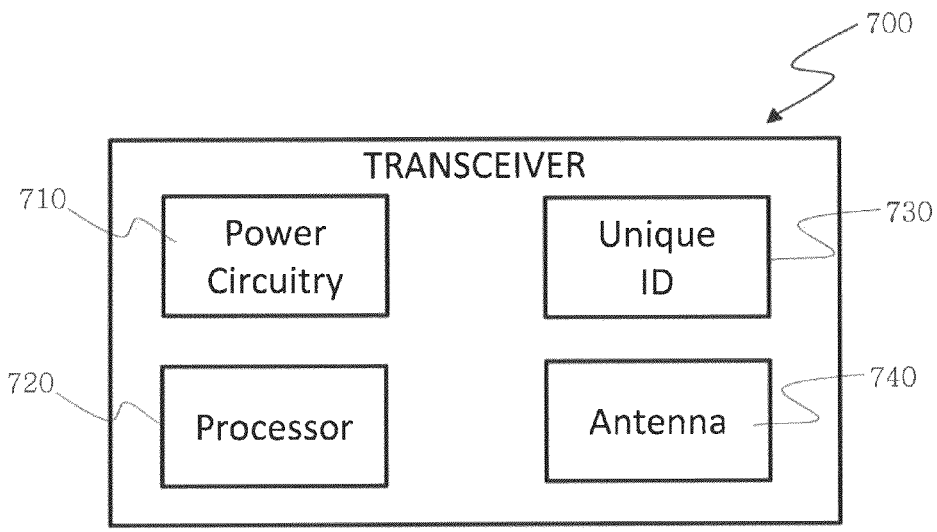
FIG. 7 is a perspective view of the interior components of an electronic beacon, in accordance with the present disclosure.

With reference to FIG. 7, there is presented a perspective view of the interior components of an electronic beacon, in accordance with the present disclosure.

In FIG. 7, the electronic beacon 700 is illustrated. In one exemplary embodiment, the electronic beacon 700 may be a transceiver. The electronic beacon 700 may include power circuitry 710, a processor 720, an internal antenna 740, and a unique identification number 730. One skilled in the art may contemplate incorporating a plurality of other functions into the electronic beacon 700. Additionally, any type of memory unit or module or storage data unit (not shown; as defined herein) may be incorporated with the electronic beacon 700. The electronic beacon 700 may also include a power means, such as a battery (not shown). Electronic beacon 700 may be identified by a unique identification number (e.g., transponder ID or transceiver ID). One skilled in the art may contemplate the use of any type of transponder or transponder configuration or the like.

Moreover, the electronic beacon 700 may be, for example, an active transponder or a passive transponder. Passive transponders do not require a battery to derive power for operation. Passive transponders derive power to operate from the electric field generated by the passive transponder. In addition, passive transponders are long lasting and support multiple frequency ranges. However, active transponders have a battery for deriving power for operation and support only one frequency. One skilled in the art may contemplate using any type of transponder in accordance with desired or suitable applications.

Figure 8:
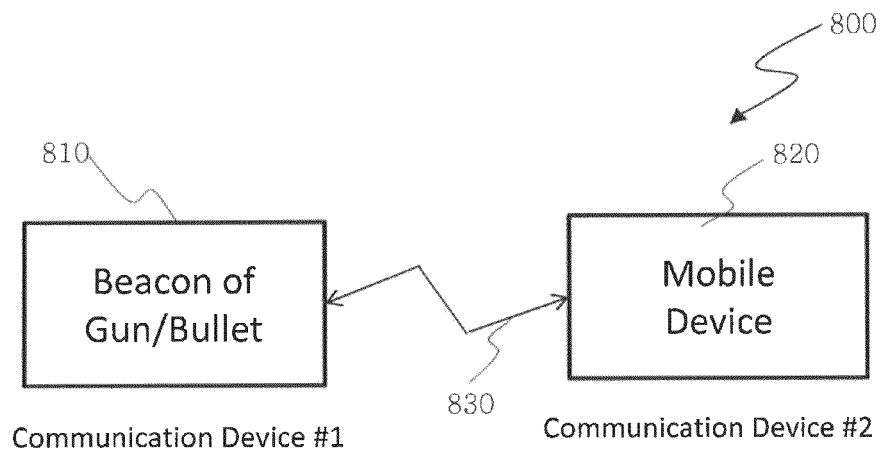
FIG. 8 is a block diagram illustrating the electronic beacon communicating with a mobile device located within the vicinity of the electronic beacon within the projectile, in accordance with the present disclosure.

With reference to FIG. 8, there is presented a block diagram 800 illustrating the electronic beacon communicating with a mobile device located within the vicinity of the electronic beacon within the projectile, in accordance with the present disclosure.

FIG. 8 merely illustrates that there is a communication 830 between a first communication device 810 and a second communication device 820. The first communication device 810 may be the electronic beacon 700 of FIG. 7, whereas the second communication device 820 may be a mobile device. The communication 830 may be a continuous communication or a periodic communication. The communication 830 may be a radio signal that is easily picked up by electronic devices, as defined herein.

Figure 9:
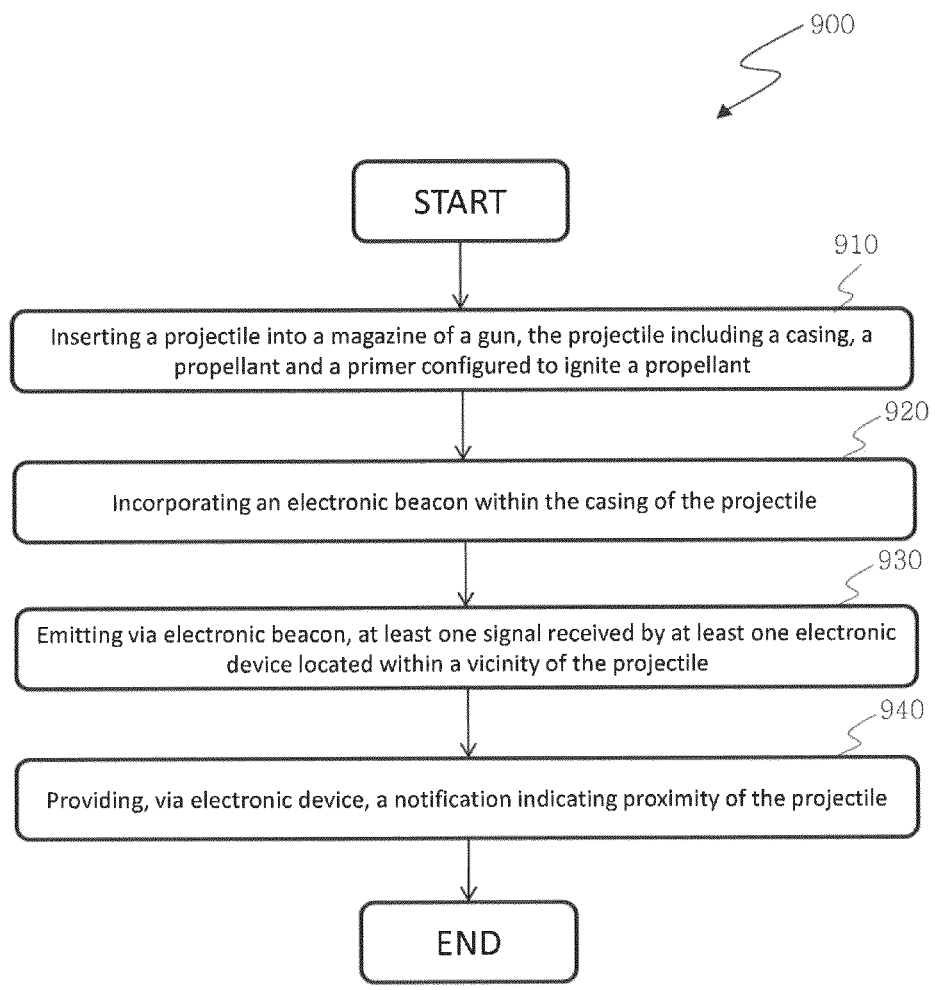
FIG. 9 is a flowchart describing how a projectile communicates with an electronic device for providing notification thereto, in accordance with the present disclosure.

With reference to FIG. 9, there is presented a flowchart describing how a projectile communicates with an electronic device for providing notification thereto, in accordance with the present disclosure.

The flowchart 900 includes the following steps. In step 910, a projectile is inserted into a magazine of a gun, the projectile including a casing, a propellant, and a primer configured to ignite the propellant. In step 920, an electronic beacon is incorporated within the casing of the projectile. In step 930, at least one signal is emitted from the electronic beacon and received by at least one electronic device located within a vicinity of the projectile. In step 940, the electronic device provides a notification indicating proximity of the projectile. The process then ends for the first cycle or first iteration. However, the process may be a continuous iterative process. In other words, the steps of the process may repeat for a number cycles or iterations, where at least the inserting, incorporating, emitting, receiving, and notifying steps are constantly repeated. It is to be understood that the method steps described herein need not necessarily be performed in the order as described. Further, words such as "thereafter," "then," "next," etc. are not intended to limit the order of the steps. These words are simply used to guide the reader through the description of the method steps.

Figure 10:
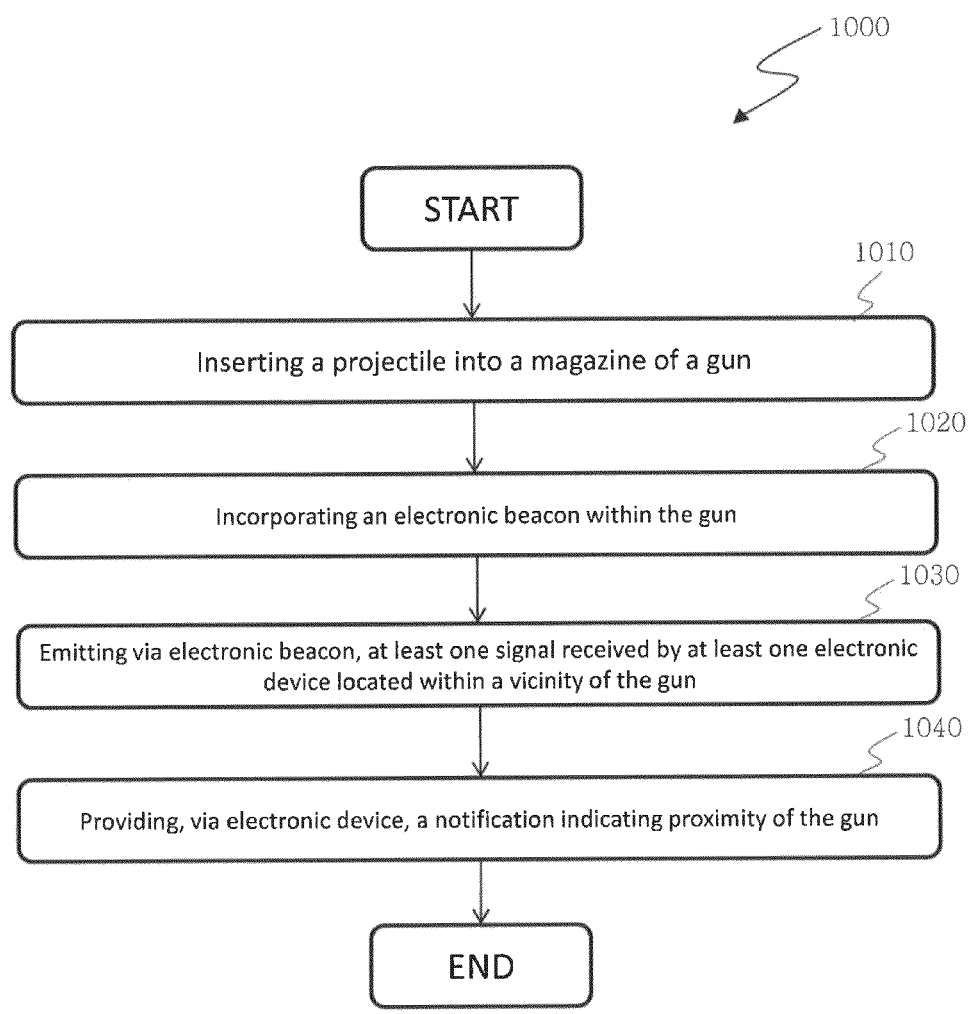
FIG. 10 is a flowchart describing how a gun communicates with an electronic device for providing notification thereto, in accordance with the present disclosure.

With reference to FIG. 10, there is presented a flowchart describing how a gun communicates with an electronic device for providing notification thereto, in accordance with the present disclosure.

The flowchart 1000 includes the following steps. In step 1010, a projectile is inserted into the gun of a magazine. In step 1020, an electronic beacon is incorporated within the gun. In step 1030, at least one signal is emitted from the electronic beacon and received by at least one electronic device located within the vicinity of the gun. In step 1040, the electronic device provides a notification indicating proximity of the gun. The process then ends for the first cycle or first iteration. However, the process may be a continuous iterative process. In other words, the steps of the process may repeat for a number cycles or iterations, where at least the inserting, incorporating, emitting, receiving, and notifying steps are constantly repeated. It is to be understood that the method steps described herein need not necessarily be performed in the order as described. Further, words such as "thereafter," "then," "next," etc. are not intended to limit the order of the steps. These words are simply used to guide the reader through the description of the method steps.

Figure 11:
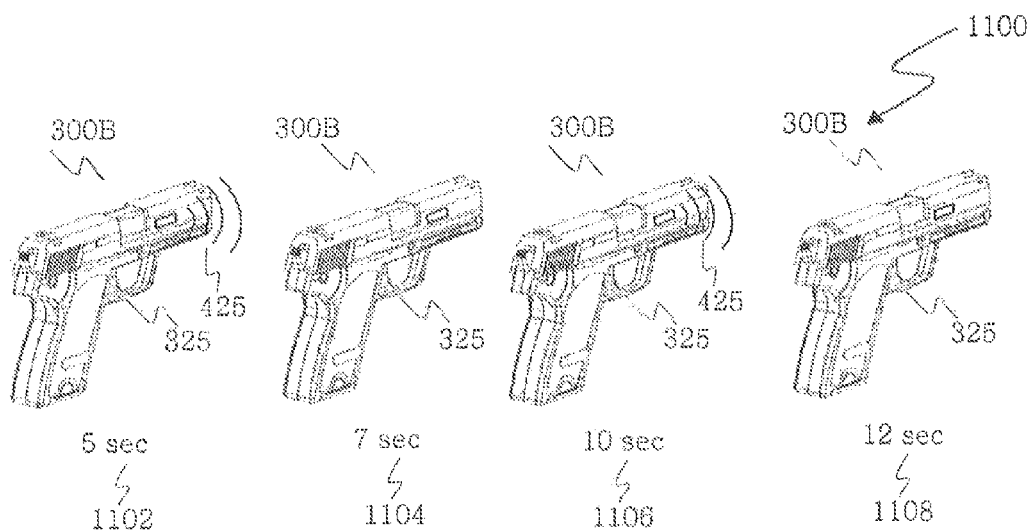
FIG. 11 illustrates an electronic beacon intermittedly or periodically sending signals to be picked up or received by an electronic device, in accordance with the present disclosure.

With reference to FIG. 11, there is presented a configuration 1100 having an electronic beacon intermittedly sending signals to be picked up by an electronic device, in accordance with the present disclosure.

In FIG. 11, at a first point in time 1102, a signal 425 is emitted from the electronic beacon 325 of the gun 300B. The first point in time 1102 may be 5 seconds. At a second point in time 1104, no signal is emitted from the electronic beacon 325 of the gun 300B. The second point in time 1104 may be 7 seconds. At a third point in time 1106, a signal 425 is emitted from the electronic beacon 325 of the gun 300B. The third point in time 1106 may be 10 seconds. At a fourth point in time 1108, no signal is emitted from the electronic beacon 325 of the gun 300B. The second point in time 1108 may be 12 seconds. In other words, it is contemplated that the signal 425 emitted from the electronic beacon 325 may be emitted in a periodic or intermittent manner, as opposed to a continuous manner. In one example, the signal 425 is emitted every 5 seconds. One skilled in the art may contemplate one or more signals 425 emitted from the electronic beacon 325 in a continuous manner or in periodic intervals of any preferred time intervals. The exemplary embodiments of the present disclosure are not limited by the manner in which the one or more signals are emitted or sent or transmitted from the electronic beacon. Of course, more than one electronic beacon may be utilized for each projectile or each gun in order to emit or send or transmit a plurality of signals. Therefore, a plurality of beacon signals operating at a plurality of different frequencies or frequency bands may be sent. Each of these signals may be associated with different identifier numbers within the electronic beacon, as described below with reference to FIG. 12.

Figure 12:
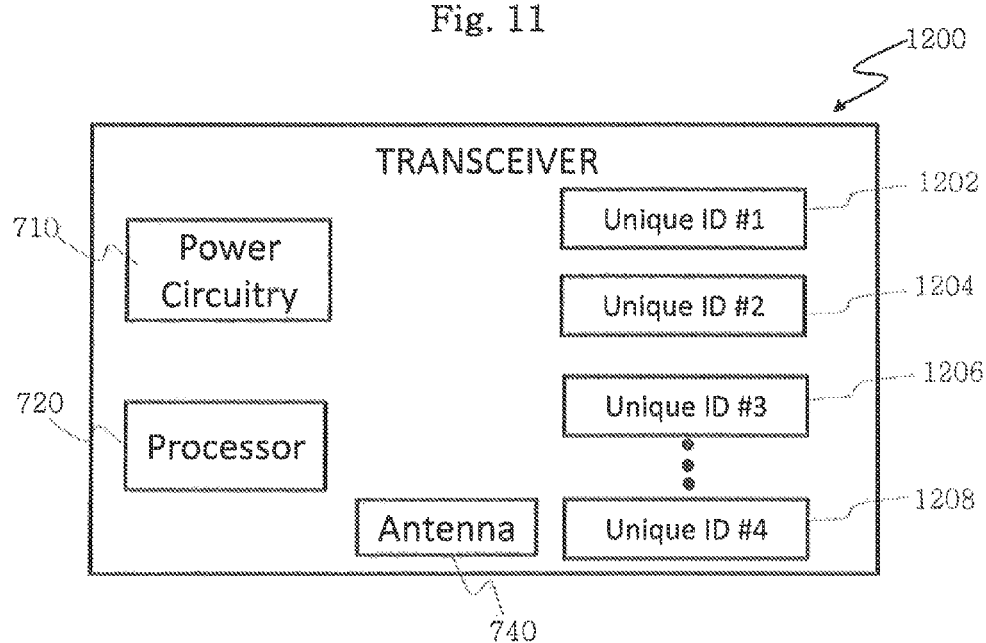
FIG. 12 illustrates a block diagram illustrating the electronic beacon communicating with a mobile device located within the vicinity of the electronic beacon within the projectile, where the electronic beacon includes a plurality of unique identifiers, in accordance with the present disclosure.

With reference to FIG. 12, there is presented a block diagram 1200 illustrating the electronic beacon communicating with a mobile device located within the vicinity of the electronic beacon within the projectile, where the electronic beacon includes a plurality of unique identifiers.

In FIG. 12, another exemplary embodiment is shown where each electronic beacon may include a plurality of unique identifiers 1202, 1204, 1206, 1206, 1208. The electronic beacon 1200 may include power circuitry 710, a processor 720, an internal antenna 740, and a unique identification numbers or identifiers 1202, 1204, 1206, 1208. One skilled in the art may contemplate incorporating a plurality of other functions into the electronic beacon 1200. Additionally, any type of memory unit or module or storage data unit (not shown; as defined herein) may be incorporated with the electronic beacon 1200. The electronic beacon 1200 may also include a power means, such as a battery (not shown). Electronic beacon 1200 may be identified by a plurality of unique identification numbers (e.g., transponder IDs or transceiver IDs). One skilled in the art may contemplate the use of any type of transponder or transponder configuration or the like.

Each identifier 1202, 1204, 1206, 1208 may activate or trigger a different signal to one or more electronic devices or mobile devices within a vicinity of the projectile and/or gun. For example, the first unique identifier 1202 may send a signal to the user of the mobile device. The second identifier 1204 may send a signal to law enforcement by dialing 911. The third identifier may transmit a signal to the user's network of friends and/or family members via a social network site, such as Facebook®, as described further below with reference to FIGS. 16 and 17. This network of friends and/or family members may be predefined or pre-established by the user of the mobile device, as described below. Thus, it is contemplated that each identifier is associated with a different entity. For example, one identifier may be identified or associated with a safe condition/state, whereas another identifier may be identified or associated with a dangerous condition/state. The projectiles and/or gun may be pre-manufactured with various identifiers to transmit or send various signals to the electronic devices picking up those signals.

Figure 13:
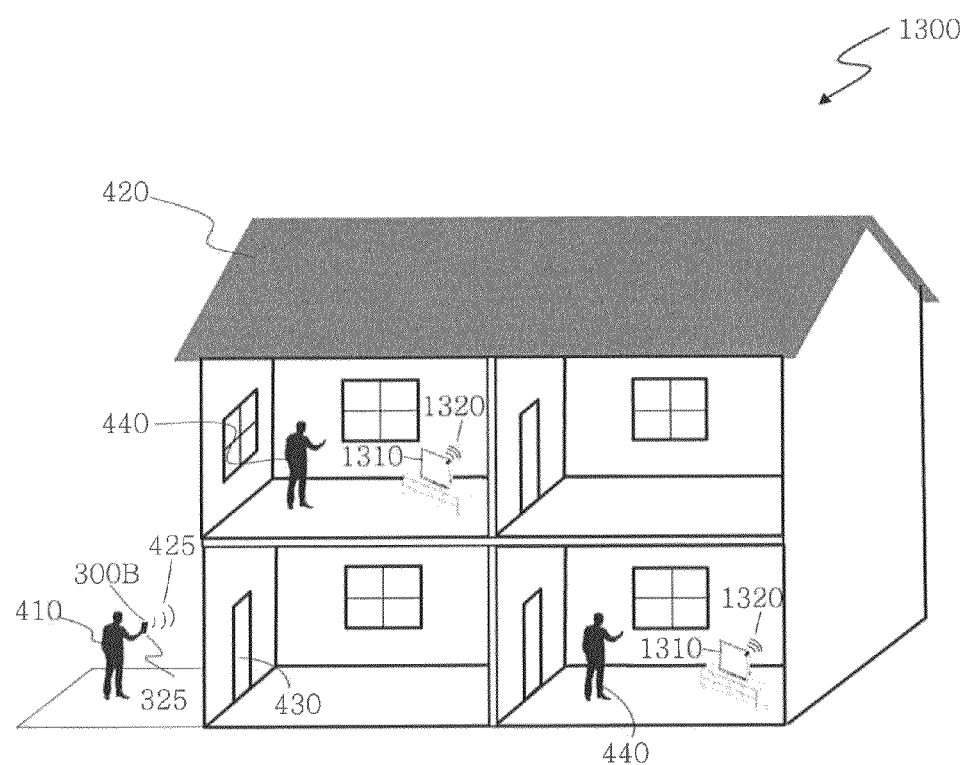
FIG. 13 is a perspective view of a loaded gun detection system, where an individual with a loaded gun is approaching a house having several people therein, and where a television identifies the beacon signal of the loaded gun, in accordance with the present disclosure.

With reference to FIG. 13, there is presented a perspective view of a loaded gun detection system 1300, where an individual with a loaded gun is approaching a house having several people therein, and where a television identifies the beacon signal of the loaded gun, in accordance with the present disclosure.

FIG. 13 is similar to FIG. 4. Therefore, a description of similar elements is omitted. In contrast to FIG. 4, instead of transmitting signals from an electronic beacon of a gun and/or projectile to a mobile device, in FIG. 13, the signals are received by an electronic device within the structure 420. The electronic device may be a television 1310 configured to emit a warning or alert or notification 1320. Therefore, if the user is watching television the television screen may display a notification signal alerting the user that a loaded gun is within his/her vicinity. One skilled in the art may contemplate any electronic device for receiving such signal from an electronic beacon integrated with a projectile and/or gun within the vicinity or proximity of the electronic device.

Figure 14:
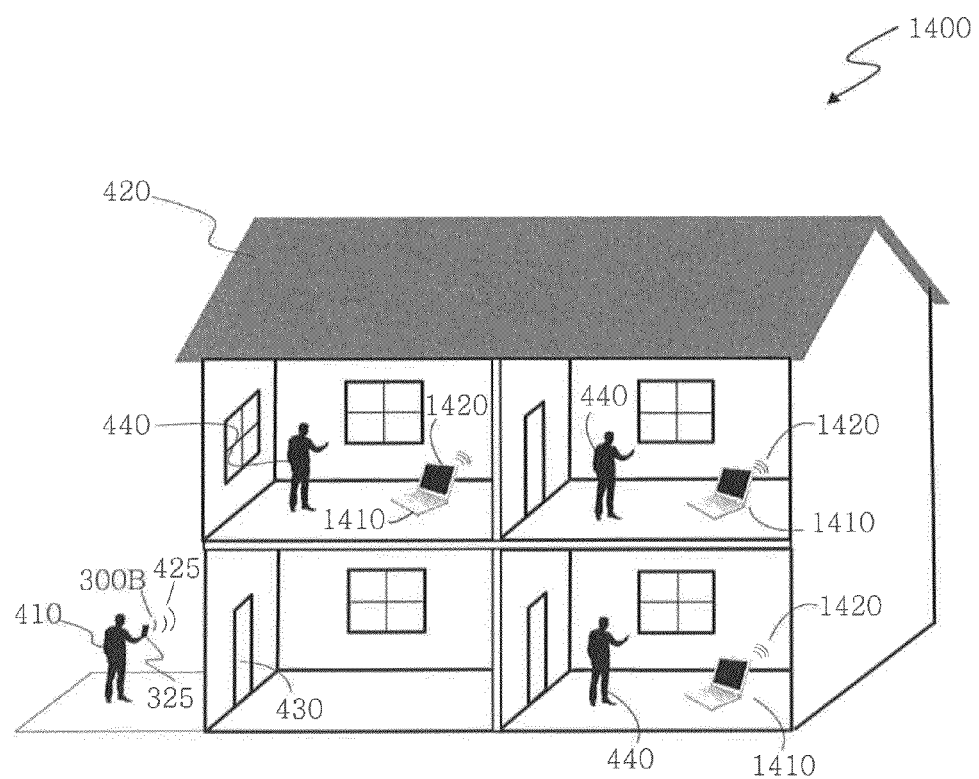
FIG. 14 is a perspective view of a loaded gun detection system, where an individual with a loaded gun is approaching a house having several people therein, and where a laptop or PC identifies the beacon signal of the loaded gun, in accordance with the present disclosure.

With reference to FIG. 14, there is presented a perspective view of a loaded gun detection system 1400, where an individual with a loaded gun is approaching a house having several people therein, and where a laptop or PC identifies the beacon signal of the loaded gun, in accordance with the present disclosure.

FIG. 13 is similar to FIG. 4. Therefore, a description of similar elements is omitted. In contrast to FIG. 4, instead of transmitting signals from an electronic beacon of a gun and/or projectile to a mobile device, in FIG. 14, the signals are received by an electronic device within the structure 420. The electronic device may be a laptop or PC or tablet 1410 configured to emit a warning or alert or notification 1420. Therefore, if the user is working or playing on his/her laptop or PC or tablet, the screen may display a notification message alerting the user that a loaded gun is within his/her vicinity.

Figure 15:
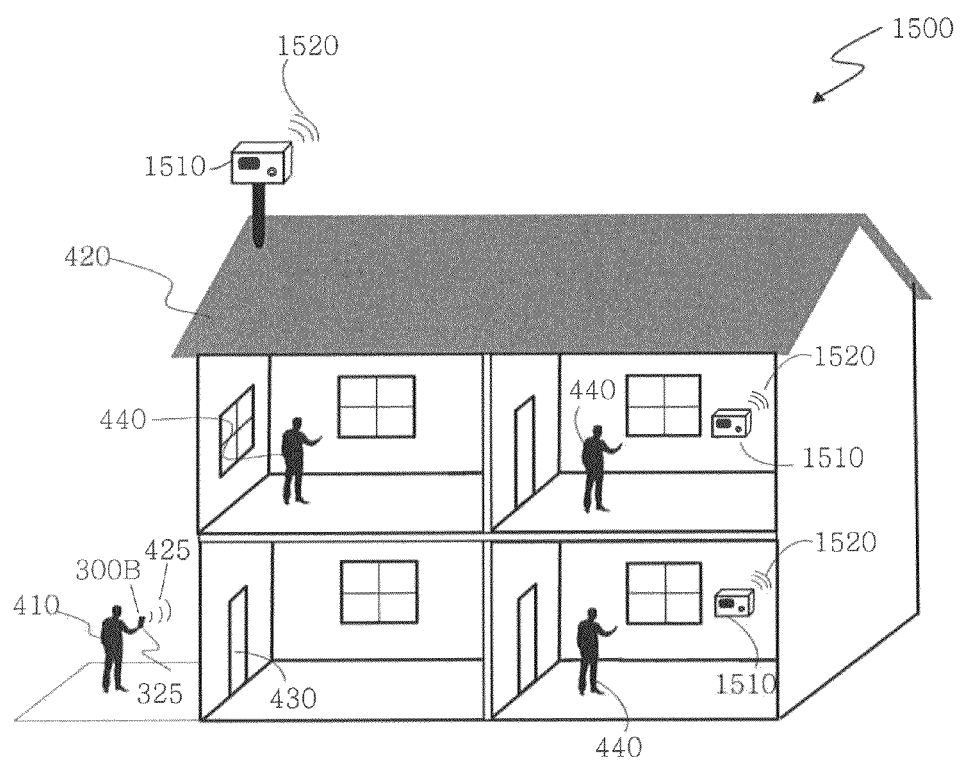
FIG. 15 is a perspective view of a loaded gun detection system, where an individual with a loaded gun is approaching a house having several people therein, and where a standalone module/unit identifies the beacon signal of the loaded gun, in accordance with the present disclosure.

With reference to FIG. 15, there is presented a perspective view of a loaded gun detection system 1500, where an individual with a loaded gun is approaching a house having several people therein, and where a standalone module/unit identifies the beacon signal of the loaded gun, in accordance with the present disclosure.

FIG. 15 is similar to FIG. 4. Therefore, a description of similar elements is omitted. In contrast to FIG. 4, instead of transmitting signals from an electronic beacon of a gun and/or projectile to a mobile device, in FIG. 15, the signals are received by a central reception module or unit 1510 within the structure 420. The central reception module or unit 1510 may be positioned within the structure 420 or on the exterior portions of the structure 420 for transmitting or sending a notification 1520 to a person within the structure 420. For example, one central reception module or unit 1510 is shown on the roof of the structure 420. However, it is contemplated that the central reception module or unit 1510 is similar to a set-top box located or placed anywhere within the structure in order to receive the beacon signal sent from a gun and/or projectile within the proximity or vicinity of the structure 420.

Figure 16:
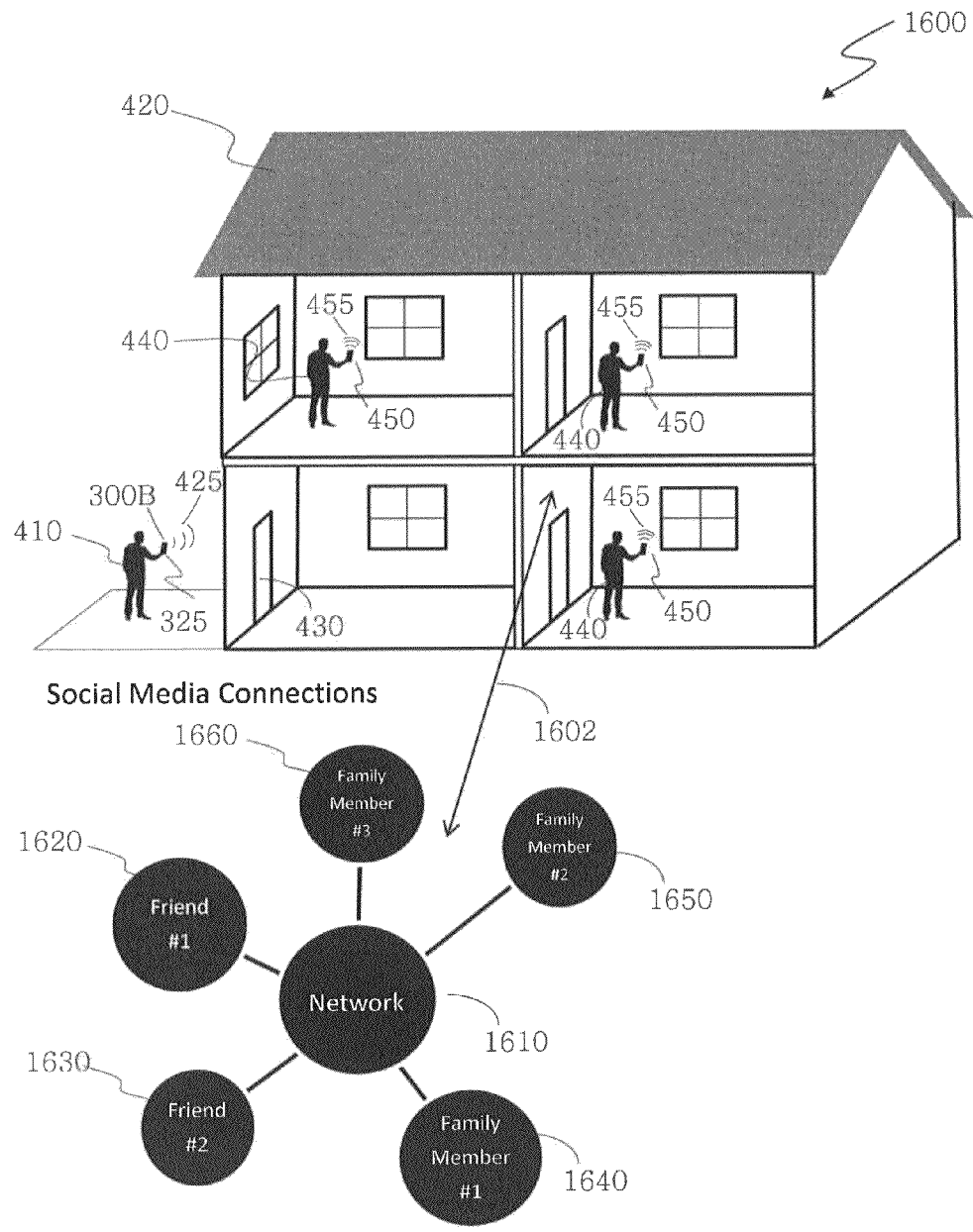
FIG. 16 is a perspective view of a loaded gun detection system where an individual with a loaded gun is approaching a house having several people therein, and where the beacon signal triggers a social network site, such as Facebook™, to notify friends or family of a potential danger to one or more of the several people therein, in accordance with the present disclosure.

With reference to FIG. 16, there is presented a perspective view of a loaded gun detection system 1600, where an individual with a loaded gun is approaching a house having several people therein, and where the beacon signal triggers a social network site, such as Facebook™, to notify friends or family of a potential danger to one or more of the several people therein, in accordance with the present disclosure.

FIG. 16 is similar to FIG. 4. Therefore, a description of similar elements is omitted. The electronic device or mobile device 450 may be automatically and directly linked to the Internet or, in particular, a social network (e.g., Facebook®) for informing family members or friends or law enforcement that a person may be in danger because a loaded gun is within their vicinity.

In FIG. 16, the mobile device 450 creates a communication link 102 with a network, for example a Facebook® network 1610. The Facebook® network 1610 may be connected to a first friend 1620, a second friend 1630, a first family member 1640, a second family member 1650, and a third family member 1660. Of course, one skilled in the art may contemplate a variety of different numbers of friends or family members or law enforcement connected to the network 1610. Of course, one skilled in the art may contemplate a plurality of different social networks, not just Facebook®, to which indicators of beacon signals may be transmitted to.

As an illustrative example, a user may create a Facebook® account and connect that Facebook® account to a warning feature of the, for example, smart phone or cell phone or tablet or PC or laptop or television. Once the smart phone or cell phone or tablet or PC or laptop or television receives a signal from a beacon incorporated/embedded/integrated with a gun and/or a projectile, the respective device may automatically link to the Facebook® account of the user and notify any predesignated people (such as friends or family members or law enforcement) that the user may be in grave danger because a loaded gun is in his/her vicinity or proximity. The friends or family members may then be able to contact the authorities or dial 911 and/or race to the location of that user to provide help. Of course, the authorities may be connected directly to the social media links.

Moreover, it is contemplated that a software app may be developed for detecting a loaded gun within one's vicinity. This software app may be downloaded by the user of the, for example, smart phone or cell phone or tablet or PC or laptop or television. This software app may link with the smart phone or cell phone or tablet or PC or laptop or television to receive the signals transmitted from the loaded gun and/or projectile located within the vicinity or proximity of the user. One skilled in the art may contemplate using any social network site for such purposes. This exemplary embodiment is not limited to Facebook@.

In summary, the electronic device provides a notification indicating a weapon and/or projectile to be within a predetermined range, the notification subsequently transmitted to at least one social network of a subject associated with the electronic device. The at least one social network permits creation of at least one predetermined list of contacts, a list of the at least one predetermined list of contacts configured to automatically receive the notification indicating the weapon and/or projectile to be within the predetermined range. The list of the at least one predetermined list of contacts includes at least one member pre-selected by the subject associated with the electronic device. The at least one member is a friend or family member or law enforcement. Therefore, a notification may be automatically sent or transmitted to any number of social networks a person of the electronic device signed up to become a member of. This may be an automatic transmission pre-established by the user of an electronic device connecting to the Internet.

Moreover, the notification is transmitted to at least one member of personal associations of the at least one social network of the subject, the at least one member to be contacted determined based on relationship weighing factors. Alternatively, the notification is transmitted to at least one member of personal associations of the at least one social network of the subject, the at least one member to be contacted determined based on interaction weighing factors. It is also contemplated that the at least one social network tracks and records notifications to the subject indicating weapons and/or projectiles within one or more predetermined ranges.

Therefore, the notification may be sent to any personal associations of the person on the social network site (i.e., friends or family members or law enforcement personnel) based on relationship factors/weights or interaction factors/weights. The relationship factor may be, for example, a close relationship or blood relationship, such as, but not limited to a father, mother, brother, sister, cousin, aunt, uncle, wife, husband, child, etc. The weight factor may be, for example, based on the number of interactions a person has had with another person on the social network site. For instance, if the person manipulating the electronic device frequently interacts with a certain person via the social network site, that "frequent interactor" may be automatically sent the notification. The "frequent interactor" may be a friend, boyfriend, girlfriend, classmate, professor, mentor, etc. Therefore, notifications may be automatically sent to at least one predesignated person in a circle/list of contacts of the subject or to non-designated people in circles/lists of contacts, the non-designated people selected, via software, based on relationship factors/weights or interaction factors/weights. These variables or parameters may be tracked and stored and recorded by the social network site.

Figure 17:
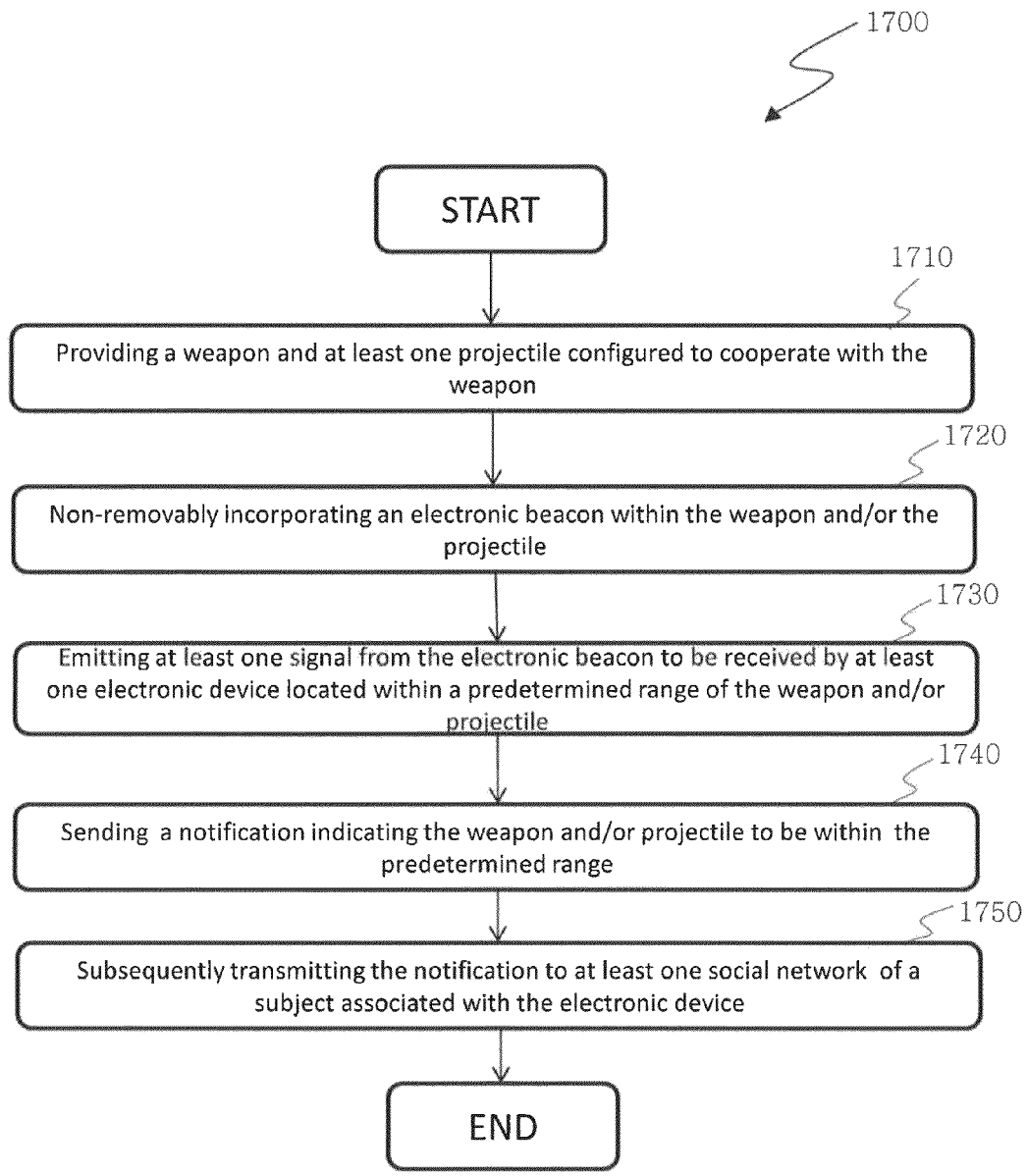
FIG. 17 is a flowchart illustrating how the electronic beacon triggers a social media site via an electronic device, in accordance with the present disclosure.

In FIG. 17 there is presented a flowchart describing how the notification is transmitted to a network of people via a social networking site, such as, for example. Facebook®, in accordance with the present disclosure.

The flowchart 1700 includes the following steps. In step 1710, a weapon is provided and at least one projectile configured to cooperate with the weapon. In step 1720, an electronic beacon is non-removably incorporated within the weapon and/or the projectile. In step 1730, at least one signal is emitted from the electronic beacon to be received by at least one electronic device located within a predetermined range of the weapon and/or projectile. In step 1740, a notification indicating the weapon and/or projectile to be within the predetermined range is sent or transmitted. In step 1750, the notification is subsequently transmitted to at least one social network of a subject associated with the electronic device. The process then ends for the first cycle or first iteration. However, the process may be a continuous iterative process. In other words, the steps of the process may repeat for a number cycles or iterations, where at least the inserting, incorporating, emitting, receiving, and notifying steps are constantly repeated. It is to be understood that the method steps described herein need not necessarily be performed in the order as described. Further, words such as "thereafter," "then," "next," etc. are not intended to limit the order of the steps. These words are simply used to guide the reader through the description of the method steps.

Moreover, a method of manufacturing the gun and/or projectile with an electronic beacon is described. The electronic beacon may be incorporated or embedded or integrated into a gun and/or projectile during manufacturing of the gun and/or projectile. In other words, the manufacturers of guns and/or projectiles may use their expertise to integrate such component in any portion of the gun and/or projectile in order to not interfere with the operation and/or function of the gun and/or projectile. The electronic beacon may also be manufactured/formed/constructed such that it cannot be tampered with by any individual. The electronic beacon may be voluntarily integrated with guns and/or projectiles by the manufacturers of such components/elements. However, legislation may be enacted by governing bodies to force guns and/or projectile manufacturers to install such electronic beacons to comply with gun control laws and for the safety of people of this nation. This would provide for a fair balance between the 2$^{nd}$ Amendment and the right of people in this country to feel safe.

Optionally, the electronic device or mobile device may have a storage area for storing, tracking, and keeping records of the indications received from an electronic beacon of a loaded gun. The records may be sent to a central storage location for further processing and analysis. For example, statistical analysis may be performed to determine areas where people receive the most or least warning or notifications, whether a danger condition is determined or safe condition is determined. The central location may be a private entity or may be a government agency. Such entities may provide feedback to the public regarding their findings and analysis. Listings of the safest places and most dangerous places, based on gun possession, may be provided on a periodic basis.

Optionally, the electronic device or mobile device may prompt the user to contact emergency services, such as 911, upon indication of one or more signals received from an electronic beacon of a loaded gun. Of course, one skilled in the art may contemplate having the electronic device or the mobile device automatically contact such emergency services upon indication of one or more signals received from an electronic beacon of a loaded gun.

Optionally, as the electronic beacon positioned in the projectile and/or the gun gets closer and closer to the user of the mobile device, visual cues may get more intense. For example, a visual cue may be flashing of the screen. The closer the loaded gun gets to the user, the faster the speed of the flashing. If the loaded gun is now moving away from the user, the speed of flashing may be slower, thus indicating that the gunman or potential threat is going in a different direction. Thus, the notification or warning or alert may be a dynamically changing indication in response to distance, orientation, or direction of the gun and/or projectile. The dynamic indication may be an intensity increasing indication or an intensity decreasing indication.

Optionally, more than one electronic beacon may be incorporated or embedded within the projectile and/or gun. Each electronic beacon may emit a different signal in a different frequency range. Of course, it is contemplated that one electronic beacon may be designed to emit or send or transmit a plurality of different frequencies within a plurality of frequency bands. If more than one beacon is utilized, then the plurality of beacons may be placed in various locations of the gun and/or projectile.

Optionally, the vicinity of the projectile (or trigger range) for triggering the notification is determined by a manufacturer of the projectile. In other words, the distance between the loaded gun and the electronic device to be triggered may be predetermined by the projectile manufacturer and/or the gun manufacturer. The distance may be any suitable distance.

Optionally, the vicinity of the projectile (or trigger range) for triggering the notification is determined and inputted by a subject handling the electronic device. In other words, the user of an electronic device or mobile device may download a software app that prompts the user to input the desired distance. The user may wish to know when a loaded gun is within 10 ft or 25 ft or 50 ft or more of the user. One skilled in the art may contemplate designing a software module or software app or computer code to allow for a plurality of different inputs by the user of the electronic device.

Optionally, it is contemplated that such projectiles and/or guns are provided for sale to the public, and maybe not to law enforcement. It is contemplated that law enforcement may continue to use projectiles and/or guns without beacon signals. However, it is contemplated that if law enforcement does use such components with beacon signals, then law enforcement may be able to disable the beacon signal under certain circumstances. In one exemplary embodiment, if a drug bust is attempted, it is contemplated that the beacon signal of the law enforcement gun or law enforcement projectiles may be disabled, such that they do not tip off the drug dealers that someone with a loaded gun is within their vicinity. A disabling or disablement feature may be provided only to law enforcement personnel, where the unique identifier is configured not be picked up by electronic devices. The disablement feature may be switched on and off at will by law enforcement. The disablement feature cannot be turned off by an electronic device within the vicinity or proximity of the gun and/or projectile.

Optionally, the electronic beacon may be picked up only by security personnel within a structure. For example, as demonstrated in FIG. 15 above, each building may include a central receptor for receiving such notification. The central receptor may be accessible only by security personnel hired to protect people within the building. Therefore, the electronic beacon may be configured to be selectively received by only certain individuals within a building, and not by all the electronic devices capable of receiving such beacon signals. Thus, selective reception of notifications may be enabled by one or more of the exemplary embodiments of the present disclosure.

Consequently, in summary, it would be desirable to provide methods and/or apparatuses and/or systems and/or mechanisms that provide a user or subject with an indication or alert or notification or warning that a loaded gun (i.e., gun and/or projectile with at least one electronic beacon signal) is approaching his/her vicinity or proximity or range or space or radius or positional orientation with respect to the electronic beacon, thus enabling the user or subject to take action, and in certain circumstances, to notify a network of friends or family members or law enforcement via at least one social network site, where the user of the electronic device is a member thereof.

Additionally, when implemented via executable instructions, various elements of the present disclosure are in essence the code defining the operations of such various elements. The executable instructions or code may be obtained from a readable medium (e.g., a hard drive media, optical media. EPROM. EEPROM, tape media, cartridge media, flash memory, ROM, memory stick, and/or the like) or communicated via a data signal from a communication medium (e.g., the Internet). In fact, readable media may include any medium that may store or transfer information.

The computer means or computing means or processing means may be operatively associated with the assembly, and is directed by software to compare the first output signal with a first control image and the second output signal with a second control image. The software further directs the computer to produce diagnostic output. Further, a means for transmitting the diagnostic output to an operator of the verification device is included. Thus, many applications of the present disclosure could be formulated. The exemplary network disclosed herein may include any system for exchanging data or transacting business, such as the Internet, an intranet, an extranet, WAN (wide area network), LAN (local area network), satellite communications, and/or the like. It is noted that the network may be implemented as other types of networks.

In this description and in the following claims, a "computer system" or "computing means" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile device or Personal Digital Assistant "PDA") where internal modules (such as a memory and processor) work together to perform operations on electronic data.

Additionally. "code" as used herein, or "program" as used herein, may be any plurality of binary values or any executable, interpreted or compiled code which may be used by a computer or execution device to perform a task. This code or program may be written in any one of several known computer languages. A "computer," as used herein, may mean any device which stores, processes, routes, manipulates, or performs like operation on data. A "computer" may be incorporated within one or more transponder recognition and collection systems or servers to operate one or more processors to run the transponder recognition algorithms. Moreover, computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types.

It will be understood that there are to be no limitations as to the dimensions and shape of the electronic beacon systems, including the storage compartment, or the materials from which the electronic beacon systems are manufactured or the electronics that may be used to run such a electronic beacon system.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

It should be noted that the language used in the specification has been principally selected for readability and instructional purposes, and may not have been selected to delineate or circumscribe the inventive subject matter. Accordingly, the disclosure is intended to be illustrative, but not limiting, of the scope of the present disclosure.

Having described the present disclosure above, various modifications of the techniques, procedures, materials and equipment will be apparent to those in the art. It is intended that all such variations within the scope and spirit of the appended claims be embraced thereby.

The foregoing examples illustrate various aspects of the present disclosure and practice of the methods of the present disclosure. The examples are not intended to provide an exhaustive description of the many different embodiments of the present disclosure. Thus, although the foregoing present disclosure has been described in some detail by way of illustration and example for purposes of clarity and understanding, those of ordinary skill in the art will realize readily that many changes and modifications may be made thereto without departing form the spirit or scope of the present disclosure.

What is claimed is:

1. A loaded gun detecting system, comprising:
a plurality of mobile devices; and
a gun including;
   a frame;
   a barrel connected to the frame;
   a magazine mechanically cooperating with the frame, the magazine having at least one projectile therein; and
   an electronic beacon incorporated within the gun, the electronic beacon transmitting at least one signal detected by at least one mobile device of the plurality of mobile devices located within a defined radial space of the gun;
   wherein the at least one mobile device of the plurality of mobile devices automatically provides a warning when the gun is within the defined radial space; and
   wherein the at least one mobile device of the plurality of mobile devices continuously provides at least a relative direction, distance, and orientation of the gun with respect to the at least one mobile device, while the at least one mobile device is maintained within the defined radial space.

2. The loaded gun detecting system according to claim 1, wherein the electronic beacon is a radio transceiver operating at at least one of a plurality of frequencies.

3. The loaded gun detecting system according to claim 1, wherein the at least one signal is continuously transmitted from the electronic beacon.

4. The loaded gun detecting system according to claim 1, wherein the at least one signal is intermittently transmitted from the electronic beacon during predetermined time periods.

5. The loaded gun detecting system according to claim 1, wherein the plurality of mobile devices are handled by non-law enforcement users.

6. The loaded gun detecting system according to claim 1, wherein the at least one mobile device of the plurality of mobile devices includes a global positioning system (GPS).

7. The loaded gun detecting system according to claim 1, wherein the warning is a visual warning or an audible warning or a combination thereof.

8. The loaded gun detecting system according to claim 1, wherein the warning is provided in real-time.

9. The loaded gun detecting system according to claim 1, wherein the defined radial space is determined by a manufacturer of the gun.

10. The loaded gun detecting system according to claim 1, wherein the defined radial space is determined by a user handling the at least one mobile device of the plurality of mobile devices.

11. A method of detecting a loaded gun, the method comprising:
introducing a plurality of mobile devices;
inserting a projectile into a magazine of a gun;
incorporating an electronic beacon within the gun;

transmitting, via the electronic beacon, at least one signal detected by at least a mobile device of the plurality of mobile devices located within a defined radial space of the gun; and enabling the at least one mobile device of the plurality of mobile devices to automatically provide a warning when the gun is within the defined radial space;

wherein the at least one mobile device of the plurality of mobile devices continuously provides at least a relative direction, distance, and orientation of the gun with respect to the at least one mobile device, while the at least one mobile device is maintained within the defined radial space.

12. The method according to claim 11, wherein the electronic beacon is a radio transceiver operating at at least one of a plurality of frequencies.

13. The method according to claim 11, further comprising continuously transmitting the at least one signal from the electronic beacon.

14. The method according to claim 11, further comprising intermittedly transmitting the at least one signal from the electronic beacon.

15. The method according to claim 11, wherein the plurality of mobile devices are handled by non-law enforcement users.

16. The method according to claim 15, wherein the at least one mobile device of the plurality of mobile devices includes a global positioning system (GPS).

17. The method according to claim 11, wherein the warning is a visual warning or an audible warning or a combination thereof.

18. The method according to claim 11, wherein the warning is provided in real-time.

19. The method according to claim 11, wherein the defined radial space is determined by a manufacturer of the gun.

20. The method according to claim 11, wherein the defined radial space is determined by a user handling the at least one mobile device of the plurality of mobile devices.

* * * * *